United States Patent
Roulier et al.

(10) Patent No.: US 10,674,754 B2
(45) Date of Patent: Jun. 9, 2020

(54) POD-BASED GRAIN POPPING APPARATUS AND METHODS OF POPPING GRAINS

(71) Applicant: Opopop, Inc., Denver, CA (US)

(72) Inventors: Bradley Roulier, Denver, CA (US); Jonas Tempel, Denver, CO (US)

(73) Assignee: Opopop, Inc., Denver, CO (US)

( * ) Notice: Subject to any disclaimer, the term of this patent is extended or adjusted under 35 U.S.C. 154(b) by 277 days.

(21) Appl. No.: 15/960,383

(22) Filed: Apr. 23, 2018

(65) Prior Publication Data

US 2019/0320692 A1    Oct. 24, 2019

(51) Int. Cl.
  A23L 7/161   (2016.01)
  A23L 7/187   (2016.01)
  B65D 81/34   (2006.01)

(52) U.S. Cl.
  CPC .............. *A23L 7/187* (2016.08); *B65D 81/34* (2013.01); *A23V 2002/00* (2013.01); *B65D 2581/3421* (2013.01)

(58) Field of Classification Search
  CPC ..... A23L 7/161–165; A23L 7/174–178; A23L 7/183; A23L 7/187
  USPC .................. 99/323.4–323.5, 323.6–323.9
  See application file for complete search history.

(56) References Cited

U.S. PATENT DOCUMENTS

| | | | |
|---|---|---|---|
| 1,961,812 A | 6/1934 | Burch | |
| 2,081,751 A | 5/1937 | Lendrum et al. | |
| 3,756,139 A | 9/1973 | Wolens | |
| 4,072,091 A | 2/1978 | Richardson | |
| 5,071,662 A | 12/1991 | Dysarz | |
| 5,501,139 A | 3/1996 | Lee | |
| 6,752,071 B1* | 6/2004 | Snyder | H05B 3/262 99/323.5 |
| 7,435,436 B2* | 10/2008 | Schilmoeller | B65D 77/225 426/107 |
| 8,276,504 B2 | 10/2012 | Korin | |
| 2006/0288876 A1* | 12/2006 | Berger | A23L 7/187 99/323.5 |
| 2015/0230505 A1 | 8/2015 | Reischmann | |
| 2016/0066605 A1 | 3/2016 | Jossem | |
| 2016/0205976 A1 | 7/2016 | Berge | |
| 2016/0374377 A1 | 12/2016 | Reischmann | |

(Continued)

OTHER PUBLICATIONS

PCT; International Search Report and Written Opinion dated Jul. 12, 2019 in Application No. PCT/US19/28534.

*Primary Examiner* — Michael A Laflame, Jr.
(74) *Attorney, Agent, or Firm* — Snell & Wilmer L.L.P.

(57) ABSTRACT

A grain-popping machine and associated pod-based popping method is disclosed. The grain-popping is configured to receive a pod. Each pod includes a plurality of cells, with each cell preferably containing a single grain kernel or seed, flavoring, and a cooking medium such as oil or shortening. In a preferred embodiment, the pod is loaded into the grain-popping machine through a slot so that it is held in position below a heating element. The heating element is activated to begin a popping sequence. When each grain kernel or seed in the pod reaches popping temperature, it absorbs the flavoring in its cell and ejects through the bottom of the pod, which is weakened to ease ejection, into a bowl positioned in a receiving area of the grain-popping machine. The pod is then removed and disposed of.

12 Claims, 22 Drawing Sheets

(56) References Cited

U.S. PATENT DOCUMENTS

2017/0245531 A1  8/2017  Rooney et al.
2017/0325488 A1  11/2017 Stopa

* cited by examiner

POD-BASED GRAIN POPPING APPARATUS AND METHODS OF POPPING GRAINS

BACKGROUND

This invention relates to a grain popping apparatus and methods of popping grains. More particularly, the invention relates to pod-based systems and methods of preparing popcorn and other popped and puffed grains that remedy the undesirable aspects of existing popping machines and methods.

Popcorn is often made in bags pre-packaged with popcorn that are then heated in a microwave, or in difficult-to-use machines that require manual loading of kernels, flavoring, and oils. Both of these solutions are less than ideal and achieve inadequate results. For example, it is difficult, if not impossible, to achieve even popping or flavoring of all kernels in microwavable bags. A user must stand next to the microwave to listen for particular popping patterns to try to guess when most of the kernels have popped. As a result, microwaving popcorn results in a high number of unpopped kernels, uneven flavoring, and burning. The interior of the bag is also covered in oil and flavoring, making it undesirable and messy to eat directly from the bag. Portion sizes are also unnecessarily large, which often results in wasted, uneaten popcorn. Existing countertop popping machines are complex to use, requiring manual measuring and loading of ingredients. They are difficult to clean because several parts must be dismantled to clean the entire machine after each use. Finally, because they use bulk flavoring and cooking of kernels, flavor can be uneven and, like microwave popcorn, existing countertop machines frequently result in unpopped kernels, uneven flavoring, and burning.

SUMMARY

The present invention resolves the myriad problems associated with existing popcorn popping systems and methods. A grain-popping machine is described that is configured to receive a pod. Each pod includes a plurality of cells, with each cell preferably containing a single grain kernel or seed, flavoring, and a cooking medium such as oil or shortening. In a preferred embodiment, the pod is loaded into the grain-popping machine through a slot so that it is held in position below a heating element. The heating element is activated to begin a popping sequence. When each grain kernel or seed in the pod reaches popping temperature, it absorbs the flavoring in its cell and ejects through the bottom cover of the pod into a bowl positioned in a receiving area of the grain-popping machine. The pod is then removed and disposed of.

The system and methods described herein therefore are easier to use and clean than existing methods of popping grains, avoid burning grains, and provide even flavoring for all grains in the pod.

DETAILED DESCRIPTION

Figure 1:
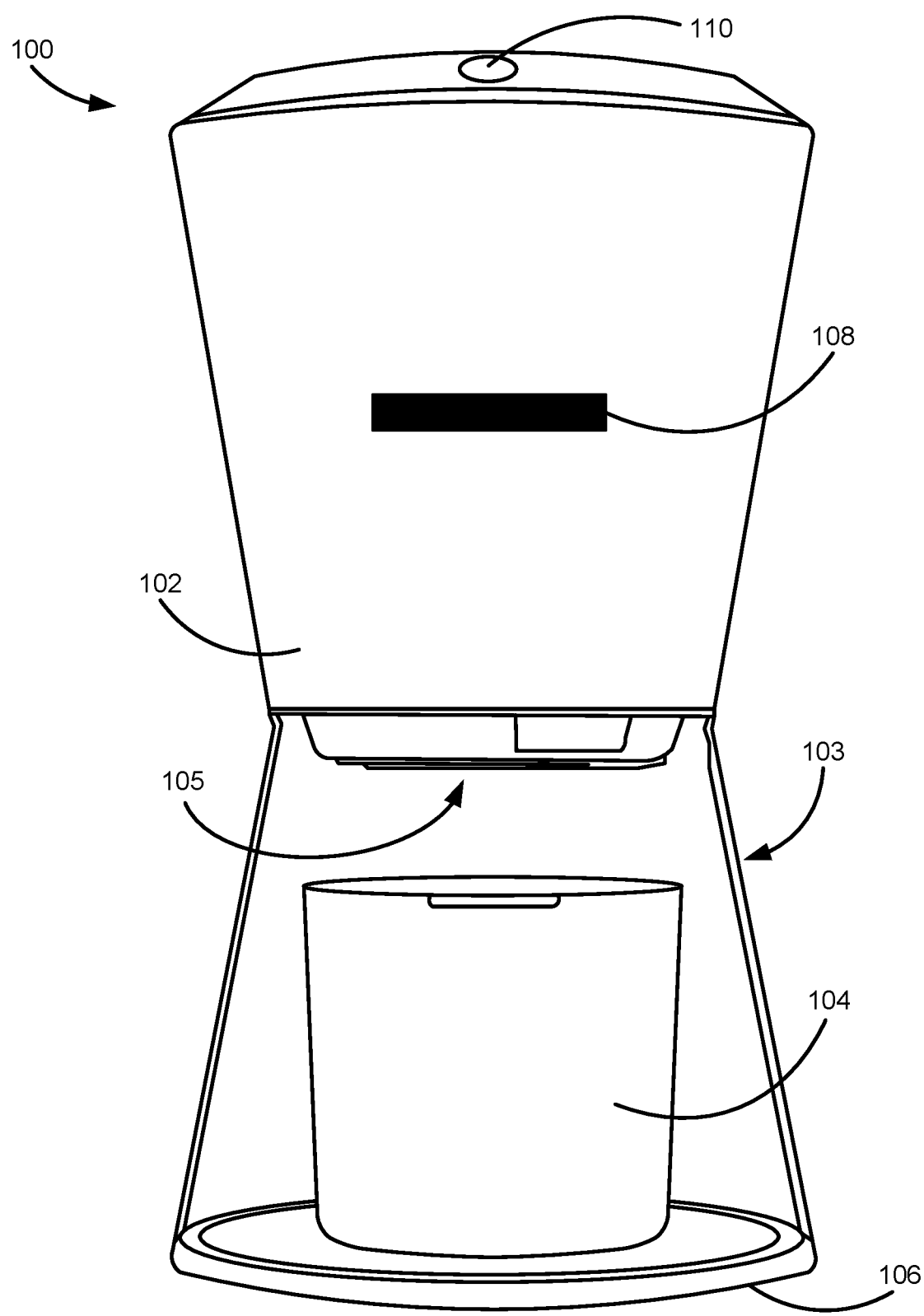
FIG. 1 is a front view of one embodiment of a grain popping machine according to the present invention.

Turning now to the drawings, in which like reference characters indicate corresponding elements throughout the several views, FIG. 1 is a perspective view of a grain-popping machine 100 according to an embodiment of the present invention. Grain popping machine 100 has an upper chamber 102. Upper chamber 102 includes a pod slot 108, which can be located at various positions on grain popping machine 100. FIG. 1 illustrates two locations on grain popping machine 100 on which pod slot 108 can be formed. While FIG. 1 illustrates two pod slots 108, it is understood that, in most embodiments, only one pod slot 108 would be required. Thus, if the upper location of pod slot 108 is chosen, the lower location would generally not be included. Pod slot 108 can receive grain pods of various shapes and sizes, as will be described in further detail herein.

In the embodiment shown in FIG. 1, pod slot 108 is rectangular. The slot could be in various other shapes in accordance with embodiments of the present invention. For example, the slot could be square, oval, or circular. Pod slot 108 can also be formed in different lengths and widths, regardless of the shape. In other embodiments, pod slot 108 is formed in different locations on upper chamber 102. For example, pod slot 108 could be formed higher or lower on the front face of upper chamber 102 or could be positioned on the side of upper chamber 102. In other embodiments, pod slot 108 is formed on the top surface of upper chamber 102. Pod slot 108 can be configured so that pods can be introduced horizontally into the grain-popping machine 100. In other embodiments, pod slot 108 is angled slightly upward so that pods are introduced into grain popping machine 100 at an angle. Angling pod slot 108 and interior guiding system for the pods allows for gravity to pull the pod down to the desired position within grain popping machine 100, and can also isolate heating elements inside the grain-popping machine 100 from exposure to the pod slot 108. Pod slot 108 can also be formed on the top of grain popping machine 100, and the pod can be inserted vertically or horizontally into the pod slot. Gravity or automated mechanism can be used to pull the pod into the appropriate position within upper chamber 102 in such embodiments, as explained in further detail herein.

A pod dock, not shown, is preferably included inside upper chamber 102 to receive a grain pod after the pod has been inserted into upper chamber through pod slot 108. When a grain pod has been inserted into upper chamber 102 through pod slot 108, it is received in the pod dock either through a user pushing the pod fully through the pod dock. Grain popping machine 100 can signal to a user that the pod has been fully received in the correct position in the pod dock through a variety of feedback mechanisms. For example, grain-popping machine can include haptic or audio feedback, for example, a mechanical click or other sound. Visual feedback, for example, a light indicator, could also be provided. Any combination of visual, audio, and haptic feedback can be used. Grain popping machine 100 can also include automatic means of positioning the pod properly in the pod dock. For example, an automated guide can be included inside upper chamber 102. When a user inserts a pod into pod slot 108, grain popping machine 100 senses that a pod has been inserted and activates the automated guide, which mechanically moves the pod into the proper position in the pod dock by, for example, actuating a clamp that grabs the pod and moves it to the proper position.

In other embodiments, a door or tray is provided in upper chamber 102 instead of pod slot 108. Upon activation by a user, the door or tray opens, exposing a pod dock. A user then inserts the pod into the pod dock. When the door or tray is pushed fully closed, the pod dock will be in the proper location in upper chamber 102 below or above a heating element, as discussed in further detail herein. The door or tray may slide out horizontally from upper chamber 102, may swing open vertically, or may swing open pivoting on the lower or upper edges of the door.

Grain popping machine 100 also includes a dock area 103. A receiver 104 is preferably provided with grain popping machine 100. Receiver 104 can be a bowl or cup as shown in FIG. 1, and is designed to receive popped grains exiting from upper chamber 102, as will be described in further detail. The receiver could be made out of various materials and can be disposable or reusable. In some embodiments, receiver 104 is a disposable cup or bowl made of a paper or plastic material. In other embodiments, receiver 104 can be formed of a ceramic or other type of reusable material. Grain popping machine 100 further includes a base 106 and an activation button 110. In a preferred embodiment, activation button 110 is centered along the front top edge of grain popping machine 100. However, it is understood that activation button 110 can be located at other locations on grain popping machine 100. Activation button 110 can physically displace when pressed, providing tactile feedback. In other embodiments, activation button 110 can be a static button that senses touch and provides haptic, visual, or audio feedback when touched. Preferably, grain-popping machine 100 is configured so that activation button 110 is the only physical button on the machine in order to provide for streamlined operation. Grain popping machine 100 can automatically turn on when a grain pod is inserted into pod slot 108, or pressing the activation button 110 can turn on the machine. In either case, pushing activation button 110 after a grain pod has been inserted into pod slot 108 can initiate a popping sequence.

In other embodiments, grain popping machine does not feature any physical buttons and both powers on and initiates a popping sequence by sensing, either mechanically or through motion sensing technology, when a grain pod has been inserted into pod slot 108. In still other embodiments, a physical button as described above can be included to power on the grain popping machine 100 and the popping sequence can be initiated when a grain pod is inserted into pod slot 108.

Figure 2:
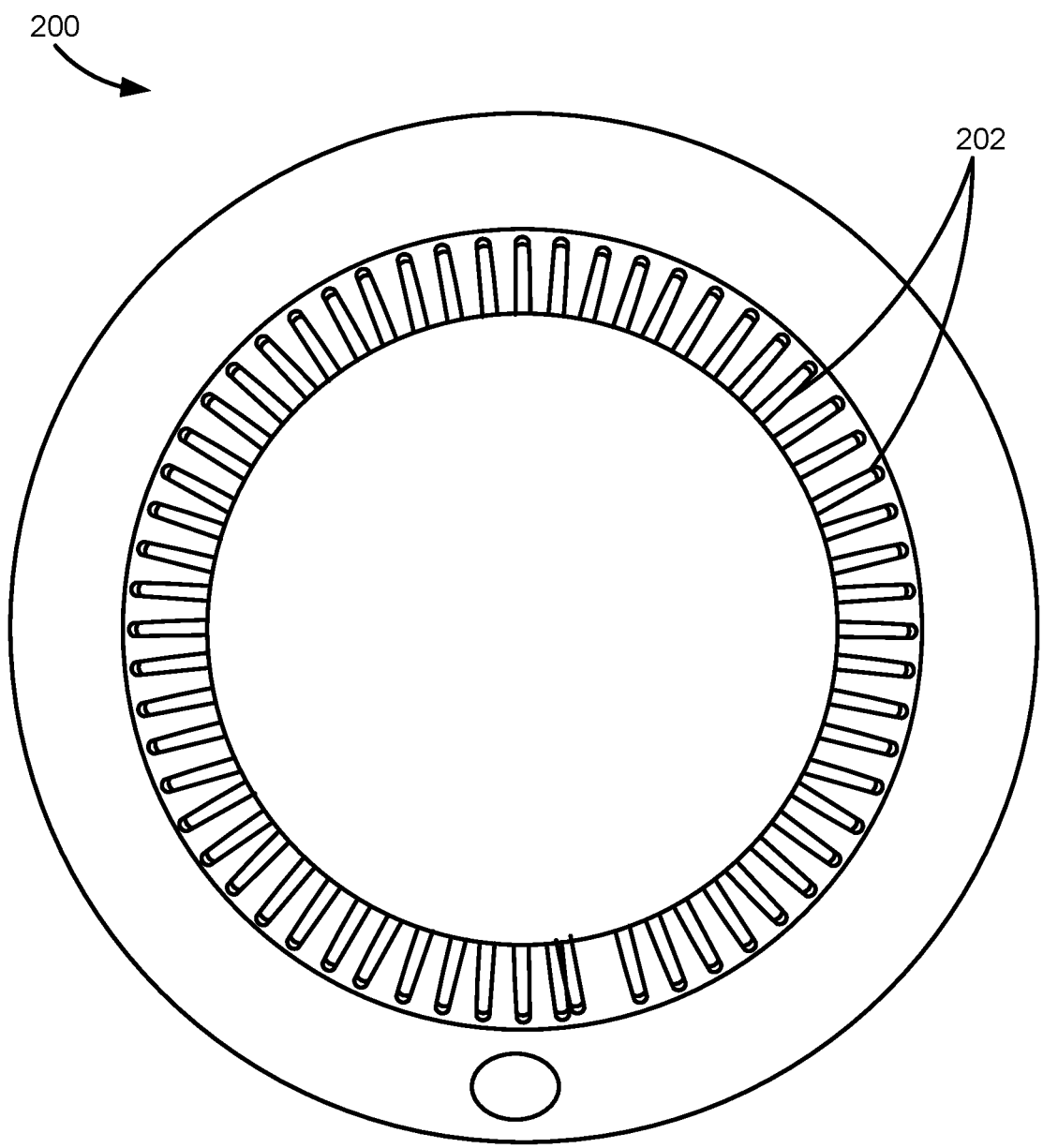
FIG. 2 is a top view of the grain popping machine of FIG. 1.

Grain popping machine 100 is operated by inserting into pod slot 108 a pod of kernels or seeds of various types of poppable grains (corn, for example) or puffable grains (rice, for example). Pod slot 108 is heated inside upper chamber 102 by a heating element, as described in further detail herein. Once the desired heat is reached, the kernels and seeds in the pod pop or puff and can be released from the pod in various ways. The popped grains exit upper chamber 102 through outlet 105 into receiver 104 for consumption by a consumer. As mentioned previously, various types of grains can be popped in grain popping machine 100. In a preferred embodiment, the grain to be popped in grain popping machine 100 is popcorn, however, other types of grains can be popped or puffed in the machine, including quinoa, wheat berries, barley, amaranth, millet, sorghum, rice, and any other grain that pops or puffs at heat or by any other activation method. As used herein, a grain is an individual fruit, kernel, grist, or seed of a cereal or grass crop, whether cultivated or wild, FIG. 2 shows top view 200 of grain popping machine 100. As shown in FIG. 2, the top 200 of grain popping machine 100 has heat and aroma vents 202, formed therein. The vents 202 can take various forms. In a preferred embodiment, shown in FIG. 2, the heat and aroma vent 202 forms a circle on the outside of top 200. In other embodiments, the entire top 200 of grain machine 100 could have venting slots formed therein. Vents 202 can be formed in various shapes, for example, in the center of the top or along the outer edge of top 200. Vents 202 could also be formed in addition to or in place of vent 202 on the sides of grain popping machine 100. Vent 202 allows heat to escape the upper chamber 102 and also allows popcorn aroma to escape upper chamber 102. In some embodiments, filters are included inside grain popping machine 100, preferably between any heating elements included therein and vents 202. The filters reduce escaping aroma, which is useful in environments where there is a concern that the aroma of popped grains would be distracting. Insulation is also included inside upper chamber 102 in some embodiments. Including insulation reduces the considerable heat generating during popping by isolating the exterior of grain popping machine from heating elements and lowering the temperature of heat escaping through vents 202.

In a preferred embodiment, grain-popping machine 100 includes sensors (not shown) for sensing various parameters that could affect popping. For example, grain-popping machine 100 preferably includes an atmospheric pressure sensor that can provide feedback to the grain popping machine 100 so that cooking times can be adjusted as necessary based on the altitude at which a particular popping sequence is initiated. Other sensors included in grain popping machine 100 include temperature sensors for both ambient air and internal temperatures. Grain popping machine 100 can also include a processor, timer, database, and associated hardware for interpreting and acting on the information provided by the various sensors. The processor is preferably in communication with a network allowing for remote updates to software provided with the processor. This can include a wireless Internet network or cellular network. The processor can include a storage medium and machine-executable instructions stored thereon that cause the grain popping machine 100 to perform various actions, for example, shortening or lengthening popping time, based on pre-set instructions and taking into account information about the surrounding environment gathered by the various sensors. The processor can also include instructions that cause the grain popping machine 100 to vary the heat applied to grain pod 300 by a heating element, the length of time heat is applied to grain pod 300, etc., based on indicators included on the pod or manually or remotely entered by a user. Examples of such indicators and methods of communicating the indicators to grain popping machine 100 are provided below. Grain popping machine 100 can also include audio sensors and corresponding machine-readable instructions to monitor when and how many kernels have popped and adjust the cooking temperature or time based on that audio feedback. Machine learning and artificial intelligence programs can be used to optimize the various sensors.

Figure 3:
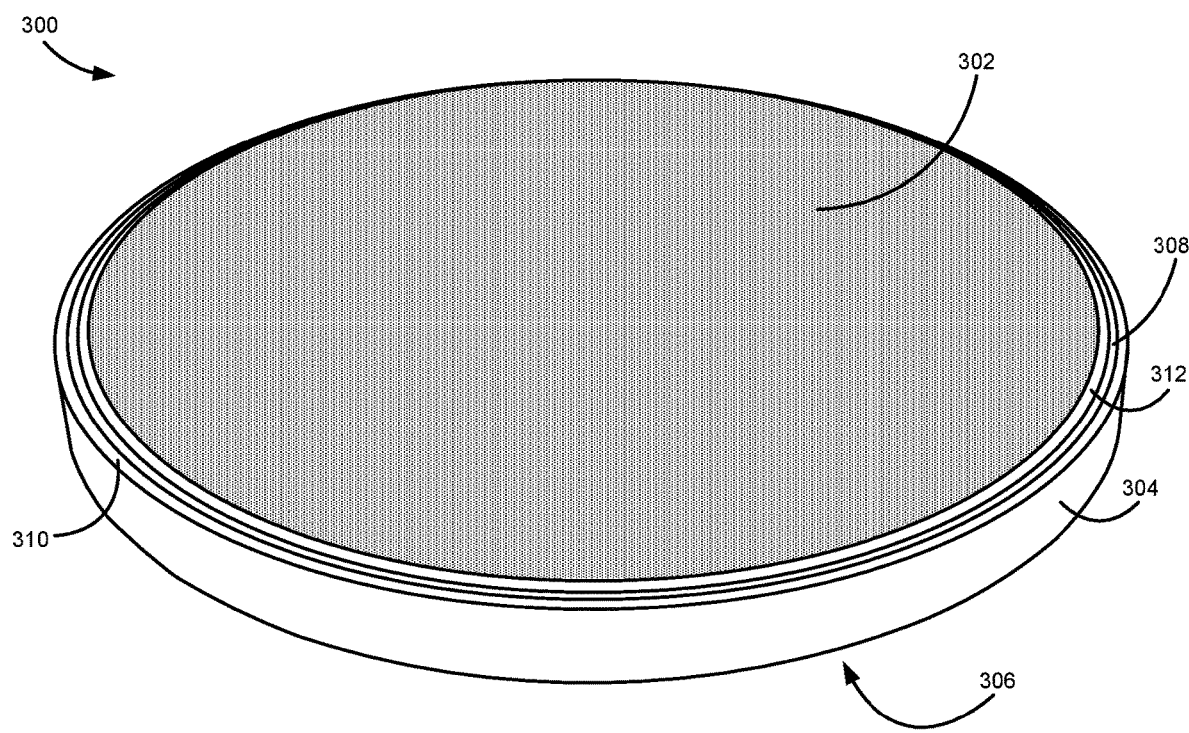
FIG. 3 is a perspective view of a grain pod according to one embodiment of the present invention.

FIG. 3 shows a preferred embodiment of a grain pod 300. Grain pod 300 includes kernels or seeds of one or more types of grains, as described previously. Although not shown in FIG. 3, in a preferred embodiment the grains are contained in individual cells inside grain pod 300. Grain pod 300 has a top cover 302, a bottom cover 306, and a sidewall 304. Grain pod 300 can be formed of various materials. In a preferred embodiment, grain pod 300 is formed of a high temperature tolerant plastic. In alternate embodiments, grain pod 300 can be formed of various metals, preferably a lightweight metal, for example, aluminum. Grain pod 300 could also be formed of a non-flammable, paper based material or any other natural or manufactured material that is resistant to high temperatures. In one embodiment, grain pod 300 is between 7 and 12 millimeters tall as measured from the top cover 302 to bottom cover 306. In other embodiments, grain pod 300 is either 9 or 10 millimeters tall between top cover 302 and bottom cover 306. Grain pod 300 can also be formed with additional insulating material between millimeters tall between top cover 302 and bottom cover 306. The insulating material can aid in stacking the pods for storage and shipment and helps to reduce the heat transmitted to the outside of grain pod 300 when it is removed from grain popping machine after a popping sequence has concluded. Grain pod 300 can also be formed with extended tabs on its periphery to aid in handling grain pod 300.

Top cover 302 of grain pod 300 is preferably formed of a heat conductive material. In a preferred embodiment, the top cover 302 is formed of a thin aluminum material or other heat conductive material. Although grain pod 300 is shown in a circular shape, it is understood that various pod shapes could be used to achieve similar results. For example, grain pod 300 could take a square or oval or rectangular form instead of the circular form showed in FIG. 3. However, the circular form shown in FIG. 3 is conducive to even heating of the grain kernels or seeds contained in grain pod 300 and may also provide for easy packaging and transportation of grouped packages of multiple grain pods. Grain pod 300, as shown in FIG. 3, also includes a channel 308 between a raised outer lip 310 and an inner wall 312. Both top cover 302 and bottom cover 306 are sealed to grain pod 300 in order to seal in the grain kernels, flavoring, cooking medium (for example, cooking oils, shortening, lard, etc.) and other edible materials contained inside grain pod 300, as will be shown in further detail herein.

Grain pod 300 can include numerous combinations of poppable or puffable grains and various flavorings, or can include kernels or seeds of only one particular type of grain. In preferred embodiments, grain pod 300 includes text, coloring, or graphics, or a combination thereof, to indicate the particular grain or grains inside the grain pod 300 and the flavoring and cooking medium included therein. In other embodiments, grain pod 300 includes a variety of grains, with each grain included having the same flavoring or with different grains in the grain pod 300 having different flavorings. Although not shown in FIG. 3, grain pod 300 may include machine-readable indicators that can communicate to grain popping machine 100 the type of grain or grains in grain pod 300, the flavor or flavors included in grain pod 300, and the type or types of oil, shortening, or other cooking medium included in grain pod 300. In a preferred embodiment, grain pod 300 includes a bar code, QR code, or other type of machine-readable coding pattern that serves as the machine-readable indicator discussed previously. In such embodiments, grain popping machine 100 includes a reader (not shown) for reading the coding pattern included on grain pod 300. The reader can be positioned inside upper chamber 102 or at the entry to pod slot 108. In other embodiments, the reader can be positioned on the outside of grain popping machine 100 so that a user can scan the code on the reader prior to inserting grain pod 300 into grain popping machine 100. The code can be printed on the grain pod 300, can be a textured pattern elevated off the surface of grain pod 300, or could simply be a color pattern on the grain pod. It is understood that the machine-readable code can be positioned anywhere on grain pod 300. However, in a preferred embodiment, the machine-readable code is formed on the bottom of grain pod 300.

In other embodiments, grain pod 300 includes spaced notches or indentations along the periphery thereof that serve as an indicator to grain popping machine 100 of the type of grain or grains in grain pod 300, the flavor or flavors included in grain pod 300, and the type or types of oil, shortening, or other cooking facilitator included in grain pod 300. The notches or indentations can be provided on grain pod 300 in a particular number, with specific distances between each notch or indentation, or in different widths, depths, or shapes, all of which, or a combination of which, can serve as the indicator discussed previously. Similar to the previous embodiment, grain-popping machine 100 can include a reader configured to read and interpret the machine-readable code formed by the notches or indentations, either mechanically, optically, or using any of a variety of sensing methods.

In still other embodiments, grain pod 300 could be formed in different shapes, thicknesses, diameters, widths, and lengths. Small variations in these variables can indicate to a reader on or inside grain popping machine 100 the type of grain or grains in grain pod 300, the flavor or flavors included in grain pod 300, and the type or types of oil, shortening, or other cooking facilitator included in grain pod 300. Alternately, or in addition to, using machine-readable indicators as described above, grain pod 300 can be formed with a simple human-readable code thereon. A human-readable code could also be provided on the packaging of a group of grain pods 300 and recorded at a central web site or user guide provided with grain pod 300. In such embodiments, grain-popping machine 100 includes a user interface that allows a user to enter the human-readable code. Alternately, a mobile device application or remote control is provided to allow a user to interface with grain popping machine 100. The mobile device application or remote control could allow the user to perform a variety of functions, including powering on/off grain popping machine 100, initiating a popping sequence, emergency power off, indicating the type of grain or grains in grain pod 300, the flavor or flavors included in grain pod 300, and the type or types of oil, shortening, or other cooking facilitator included in grain pod 300, ordering additional grain pods 300, submitting a help request, submitting a service call, etc.

Figure 4:
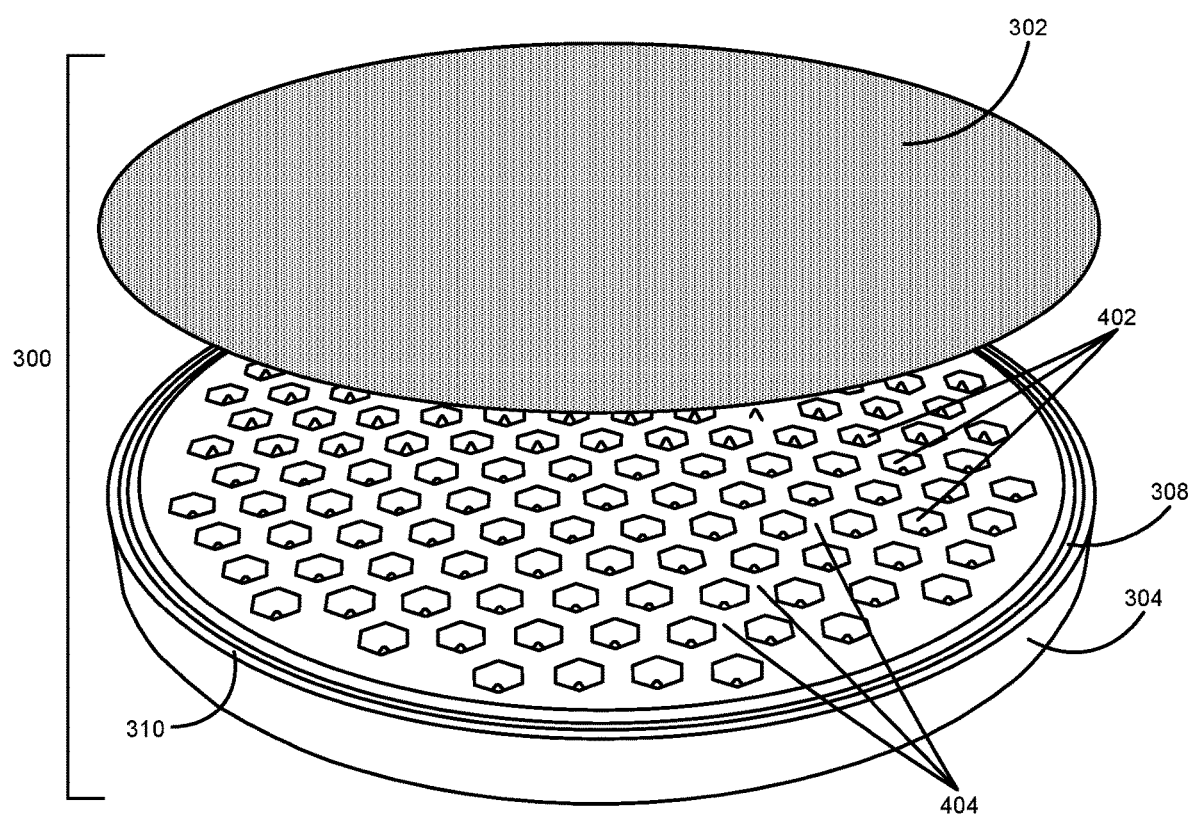
FIG. 4 is a top perspective view of the grain pod of FIG. 3.

FIG. 4 shows an exploded view of grain pod 300 with the top cover 302 hovering above the grain pod 300. As shown in FIG. 4, numerous cells 402 are formed on the interior of grain pod 300. Each cell 402 is designed to hold a kernel or seed of a grain, for example, corn. In addition to the kernels, cells 402 hold flavoring and a cooking medium to facilitate popping of the corn when exposed to heat for a prolonged period. As shown in FIG. 4, cells 402 are formed in a generally honeycombed pattern at even distances from each other. As will be described in other embodiments herein, cells 402 could also be formed in a circular, square, oval, octagonal, or other shapes. FIG. 4 also shows cell walls 404, which separate cells 402. In other embodiments, cell walls 404 could be thinner or thicker than shown in FIG. 4. In addition, grain pod 300 could be formed without cells and cell walls and instead have one layer of kernels or seeds distributed roughly equally across the interior surface area of grain pod 300. For example, grain pod 300 could be formed with a flat chamber therein to hold kernels in a single layer or multiple layers inside grain pod 300. During manufacturing, grain kernels are placed within cells 402 along with flavoring and cooking medium and any other desired ingredient to enhance the flavor, appearance, or popping qualities of the grain. Once the kernels are inside cells 402, the top 302 is sealed onto grain pod 300.

In a preferred embodiment, grain pod 300 includes approximately 1.5 to 3.5 tablespoons of grains or kernels, with each cell including a single kernel or grain. More preferably, each grain pod 300 includes 2.5 tablespoons of grains or kernels, with that result that each popping sequence produces between 4.5 and 5 ounces of popped grains. However, in other embodiments larger pods containing more kernels or grains can be provided while still retaining the benefits of pod-based popping.

Figure 5:
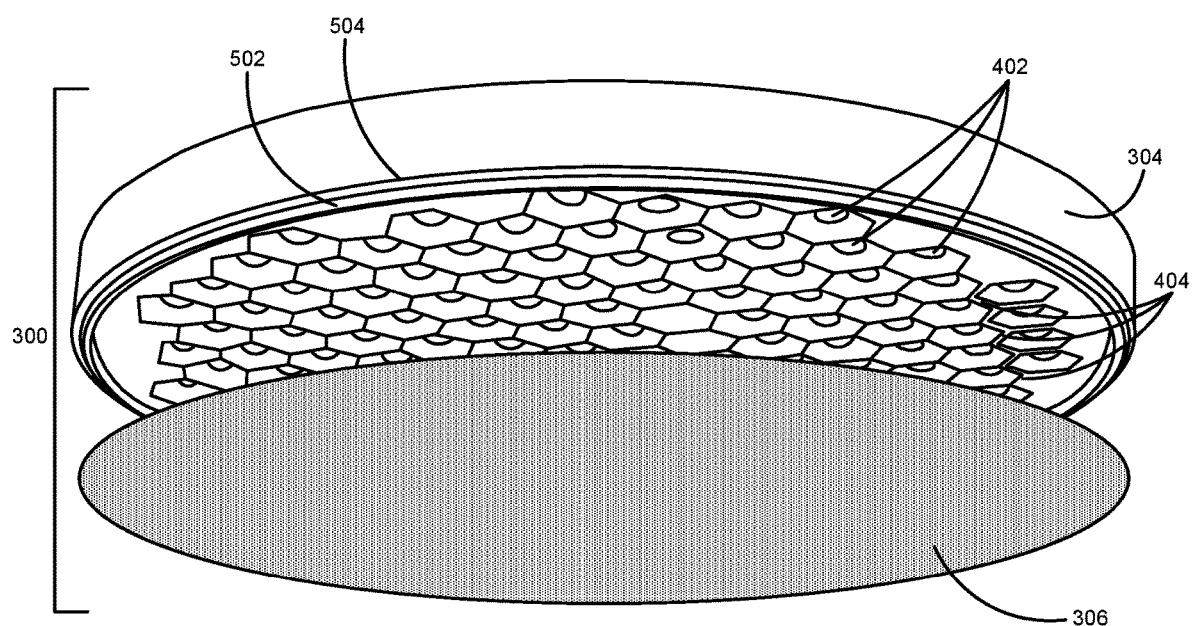
FIG. 5 is a is a bottom perspective view of the grain pod of FIG. 3

FIG. 5 shows an exploded view from below grain pod 300. As shown in FIG. 5, bottom cover 306 has not yet been affixed to grain pod 300. Bottom cover 306 can be formed of a variety of materials. In a preferred embodiment, bottom cover 306 is formed of a high temperature compatible paper that will allow for easy exit of popped kernels from cells 402. In other embodiments, bottom cover 306 is formed of a lightweight metal foil, preferably aluminum foil. As described in further detail herein, bottom cover 306 can be formed with perforations or other mechanically weakened points to facilitate escape of popped kernels from grain pod 300. Bottom cover 306 could also be formed of a material that weakens as it gets hotter so that the material is weakened once grains reach a certain temperature, thereby allowing the grains to escape from cells 402. As shown in FIG. 5, the sidewall 304 of grain pod 300 may have an inner lip 502 formed on the bottom side thereof. Grain pod 300 may also include a notch 504 on the bottom side of sidewall 304. The mechanical use of inner lip 502 and bottom 504 will be explained in further detail herein.

Figure 6:
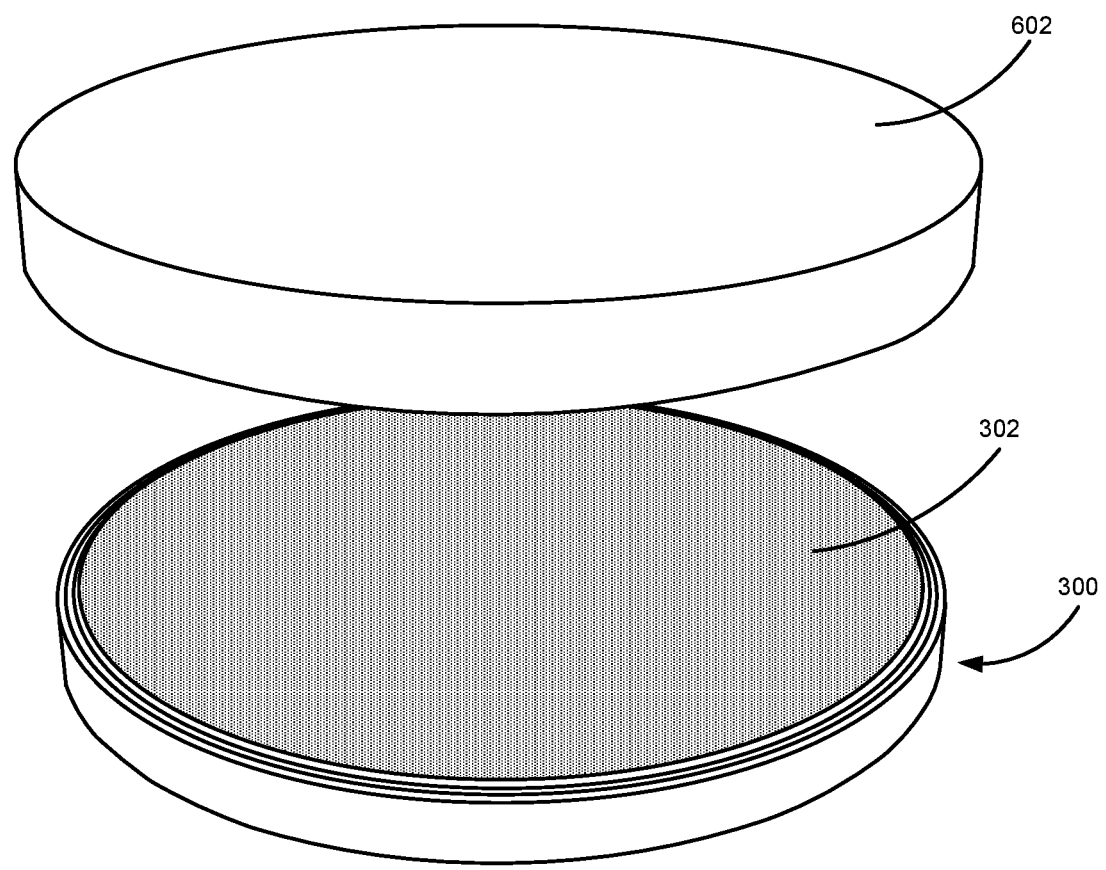
FIG. 6 is a perspective view of a grain pod and a heating element

FIG. 6 shows a heating element 602 positioned above a grain pod 300. Heating element 602 can be formed of a metal ceramic polymer or composite material. Heating element 602 could also be formed of a combination of any of the previously mentioned types of heating elements. In a preferred embodiment, heating element 602 is formed of a metal material such as nichrome. In other embodiments, heating element 602 can be formed of metal such as kanthal or cupronickel. Heating element 602 may also be formed of an etched foil. While heating element 602 is shown as a solid circular slab in FIG. 6, in some embodiments of the invention, heating element 602 could be formed as a collection of wires, ribbons, or strips.

Heating element 602, regardless of the material from which it is made, can also be formed in different shapes. For example, it could be a square element, it could be in a rectangular shape, could be in an oval shape, and it could have various thicknesses. Preferably, the shape of heating element 602 matches that of grain pod 300. This configuration allows for even heating across the surface of grain pod 300, resulting in more even popping of the kernels or grains therein. In addition, heating element 602 could be formed to wrap around grain pod 300 so that grain pod 300 nests within heating element 602, or a second heating element could be provided underneath grain pod 300 for all or a portion of the popping sequence. In such embodiments, the second, lower heating element could be automatically removed at a designated time or point during the popping sequence so as not to interfere with the popped kernels or grains as they exit grain pod 300.

In other embodiments, heating element 602 is formed of ceramic heating element such as molybdenum disilicide or various PTC ceramic elements. Heating element 602 could also be formed of polymer PTC heating elements including PTC rubber materials. Heating element 602 may also be a radiative heating element, such as a high-powered incandescent lamp or other type of radiant heating elements, for example, an R40 reflector lamp or similar lamps. In operation, heating element 602 is placed directly above or in contact with top cover 302 of grain pod 300. As heating element 602 heats to an appropriate temperature depending on the type of grain and other factors, the kernels inside grain pod 300 heat, eventually heating to a temperature at which the specific grain pops and the grains then exit the grain pod 300. In some embodiments, a conductor material, for example, copper, is positioned between heating element 602 and grain pod 300. The conductor material ensures that heat from heating element 602 is evenly applied across the top surface of grain pod 300, and also helps moderate the speed at which maximum cooking temperature is reached.

Positioning heating element 602 above grain pod 300 and configuring grain pod 300 so that popped grains escape grain pod 300 through the bottom cover 306 provides several advantages. For example, allowing the popped grains to exit the bottom cover 306 directly into receiver 104 greatly reduces the surface area of grain popping machine 100 that requires cleaning. Only the relatively small portion of upper chamber 102 between the bottom of grain pod 300 and receiver 104 is contacted by popped grains. That portion of upper chamber is easily reached for cleaning without disassembling grain popping machine 100. In contrast, in prior art systems using free loaded grains instead of pods, the heating element was placed below the grains, so that when the grains popped they would exit up and around a heating element to fall into a bowl. In doing so, the grains contact almost the entire interior surface area of a machine, which must then be dismantled regularly for detailed cleaning and disinfecting. In addition, positioning grain pod 300 below heating element 602 ensures that no popped grains fall back into or on top of grain pod 300 after being popped, thereby reducing the risk of overcooked or burnt kernels, which negatively affect a user's experience. Popped grains exit their particular cell 402 immediately upon popping and are removed from the area of heating element 602 to receiver 104, reducing the chance of overcooking or burning and accommodating for slight variances in popping times between individual grains.

Figure 7:
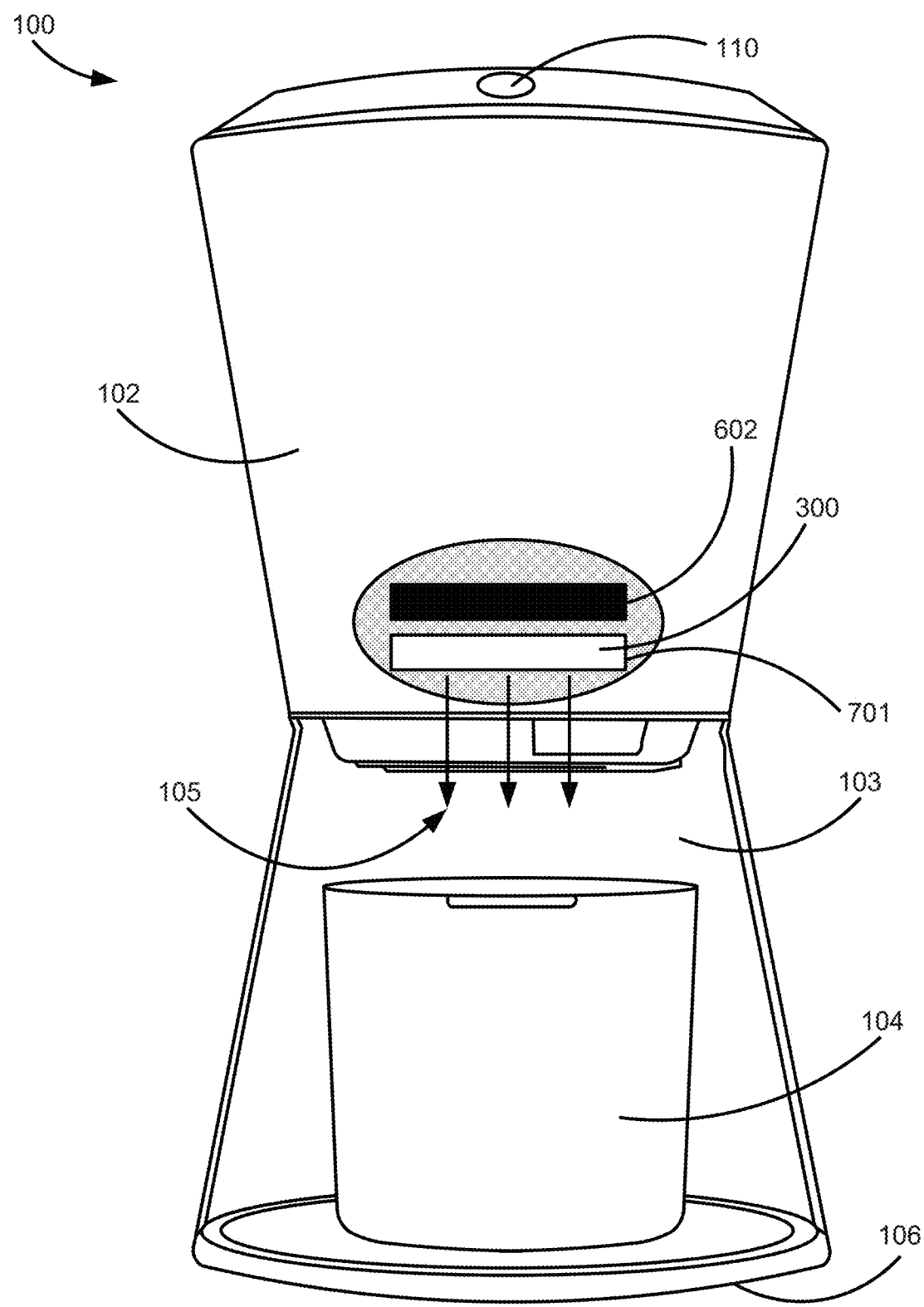
FIG. 7 is a front and limited interior view of a grain popping machine according to an embodiment of the present invention.

FIG. 7 shows grain-popping machine 100 with heating element 602 and grain pod 300 positioned within upper chamber 102. The circular opening shown in FIG. 7 is included as a window to the inside of upper chamber 102 for purposes of illustration. In preferred embodiments, only pod slot 108 is formed on the exterior of upper chamber 102 so that heating element 602 and grain pod 300 are not visible from the exterior of upper chamber 102. As shown in FIG. 7, heating element 602 is positioned directly above, and in some embodiments, in contact with the top of grain pod 300 inside upper chamber 102. As heating element 602 heats the kernels inside grain pod 300 to a target temperature for a prolonged time, both of which vary depending on the type of grain used, flavoring, cooking medium, and other environmental conditions such as pressure and altitude, the kernels pop and the popping of the kernels causes them to eject from the bottom of grain pod 300 through bottom cover 306, out of upper chamber 102, and into receiver 104. By having the kernels exit grain pod 300 through the bottom, the surface area of upper chamber 102 contacted by popped grains and liquids is kept at a minimum because the popped kernels do not contact any of the other surfaces of upper chamber, which reduces cleaning time and difficulty and makes grain popping machine 100 operate more cleanly than prior art machines. After popping, grain pod 300 is ejected from grain popping machine 100 and can be disposed of in a trash receptacle so that the machine is immediately able to receive another grain pod. The popped kernels can be removed from the grain-popping machine by removing receiver 104, which can serve as a bowl for serving the popped kernels. Preferably, each grain pod 300 includes only enough popped kernels to form a single serving of the particular popped grain chosen. As detailed above the respective FIG. 1, the popped kernels exit upper chamber 102 through outlet 105, which is open to the bottom of grain pod 300.

Ideal cooking times and temperatures for a particular grain pod 300 vary based on the types of grains, flavorings, and cooking medium included in cells 402, as well as ambient temperature, pressure, altitude, and other variables. As detailed above, grain popping machine 100 can include a processor and associated hardware and software to account for these variables and automatically alter cooking times and temperatures accordingly. However, in preferred embodiments, heating element 602 is heated to between approximately 325 degrees Fahrenheit and 600 degrees Fahrenheit, and more preferably to a constant temperature of 400 degrees Fahrenheit, with a variance of plus or minus 10 degrees. In other embodiments, heating element 602 can vary temperatures during the popping sequence to achieve a max temperature earlier or later in the sequence.

Temperature sensors can also be provided to directly sense the temperature inside cells 402 and the processor can include instructions to dynamically alter the temperature of heating element 602 during a popping sequence to optimize the temperature reached by grains in the cells 402 and ensure that no grains are overcooked or burned. Humidity sensors can also be included in grain popping machine 100, either to measure ambient humidity outside or inside upper chamber 102, or more preferably to measure humidity inside cells 402 to determine whether a predetermined cooking time and temperature should be altered to optimize popping of grains in a particular grain pod 300. In a preferred embodiment, the entire popping sequence is completed in less than one hundred and twenty seconds. More preferably, the popping sequence from insertion of grain pod 300 to the time at which all grains have popped and entered receiver 104 is completed in approximately sixty seconds, or less. In other embodiments, the popping sequence is completed in approximately one hundred and eighty seconds, that is, one hundred eighty seconds plus or minus thirty seconds to accommodate for variables.

Figure 8:
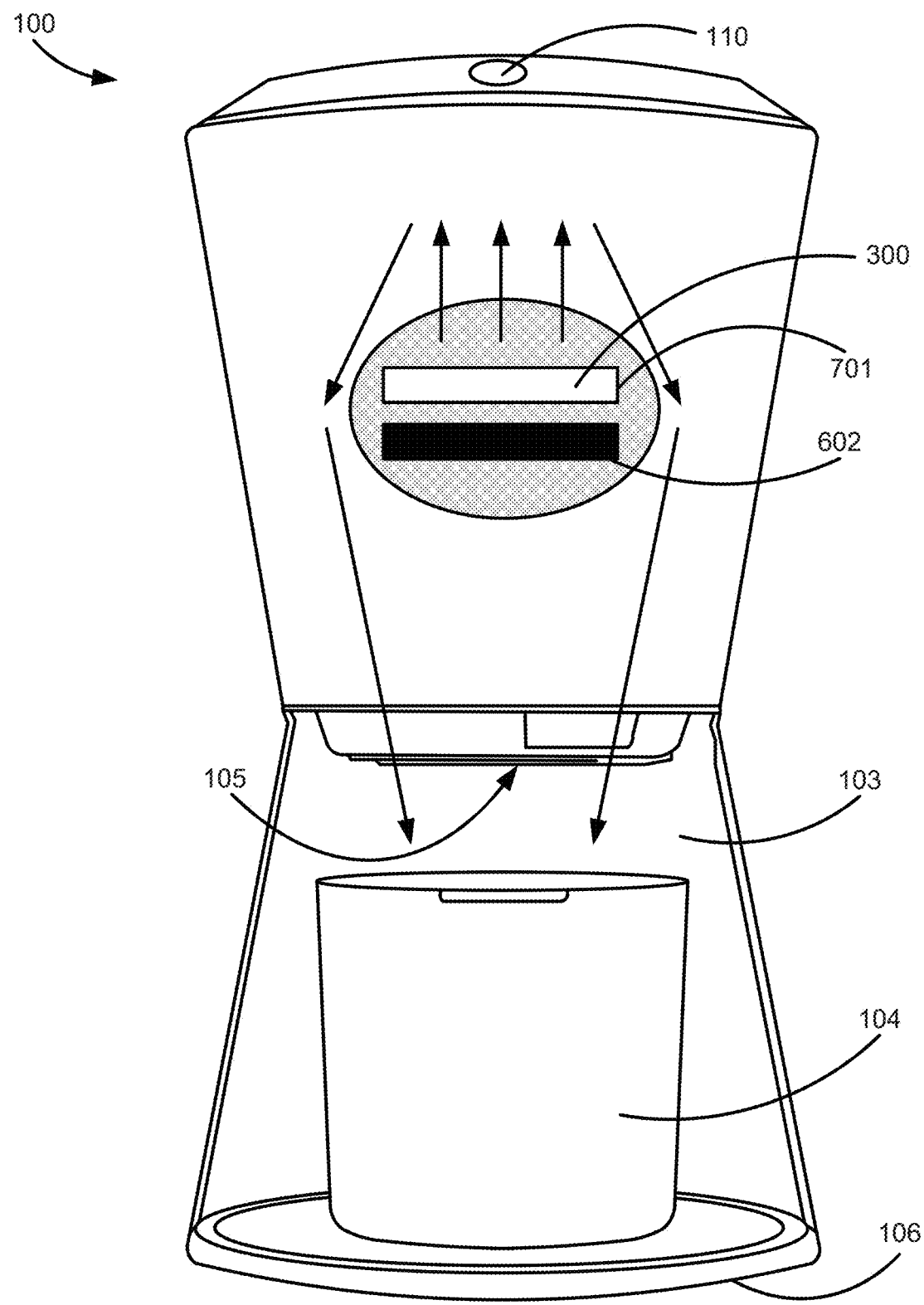
FIG. 8 is a front and limited interior view of a grain popping machine according to another embodiment of the present invention.

FIG. 8 shows an alternate embodiment of grain popping machine 100. In this embodiment, heating element 602 is positioned below grain pod 300. The circular opening shown in FIG. 8 is included as a window to the inside of upper chamber 102 for purposes of illustration. As heating element 602 reaches the temperature to pop the kernels in grain pod 300, the kernels pop and exit the grain pod 300 and are funneled back down by gravity through outlet 105 and into receiver 104, as shown by the arrows in FIG. 8.

Figure 9:
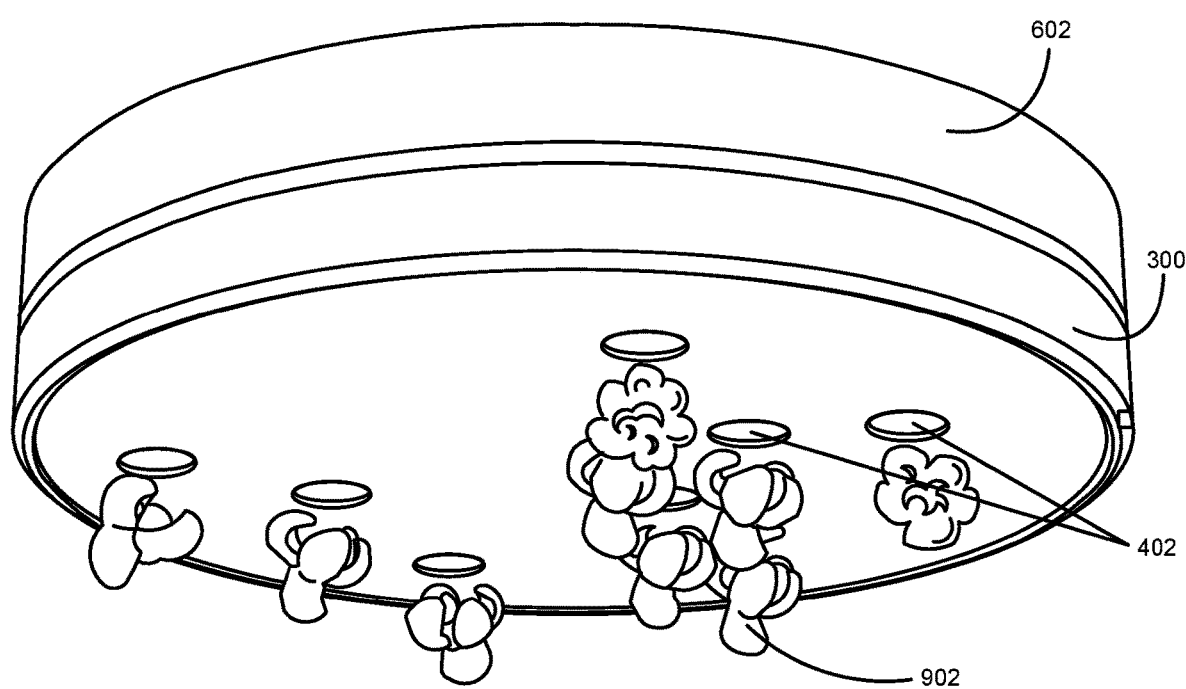
FIG. 9 is a bottom perspective view of the grain pod of FIG. 3 illustrating kernels individually exiting the grain pod

FIG. 9 illustrates popped kernels 902 exiting through bottom cover 306 of grain pod 300. The orientation of heating element 602 above grain pod 300 is similar to the orientation shown in the grain-popping machine of FIG. 7. Because each cell 402 contains a single kernel, each kernel is free to pop when that particular kernel reaches the appropriate temperature for the particular kernel. This allows for slight variations in the popping time for different kernels in the same grain pod 300 so that kernels that might pop earlier than other kernels are not burned by being kept in contact with a heat source after popping.

Figures 10A, 10B:
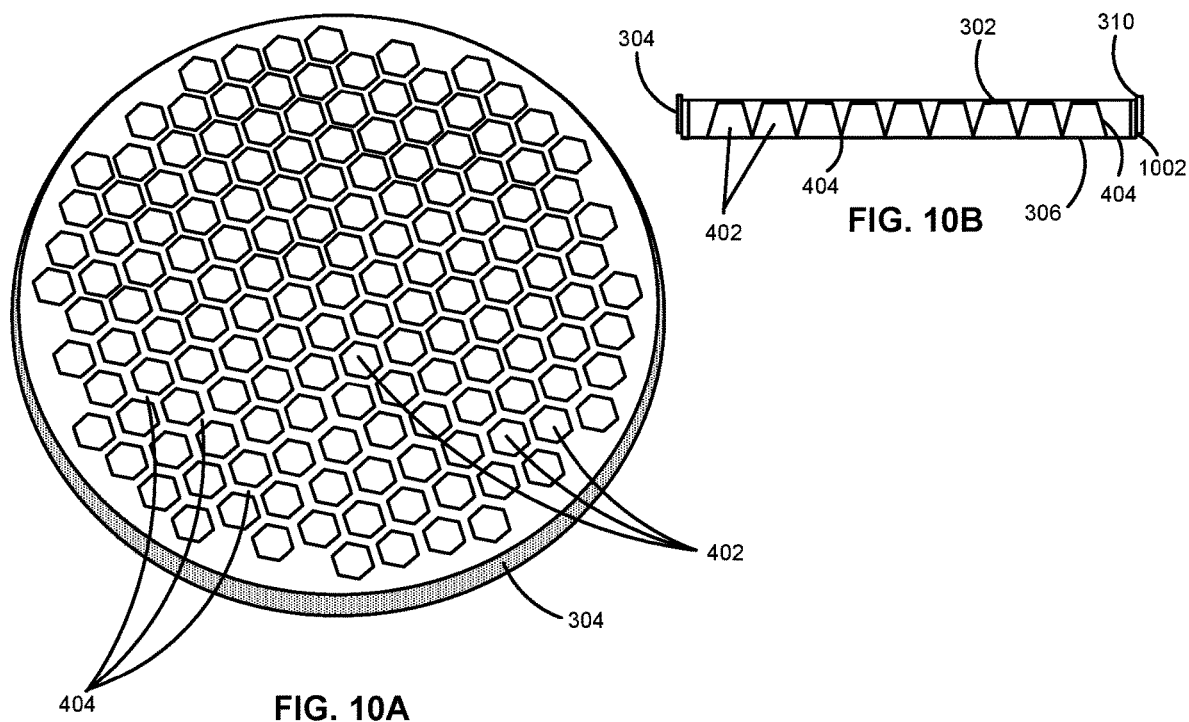
FIGS. 10A and 10B are top perspective and cross-section views, respectively, of the grain pod of FIG. 3.

FIGS. 10A and 10B illustrate a preferred embodiment of grain pod 300. As shown in FIG. 10A, grain pod 300 is formed in a generally circular or cylindrical shape with cells 402 and cell walls 404. The cells of the grain pod shown in FIG. 10A are formed in a hexagonal shape similar to a honeycomb. In a preferred embodiment, the cells 402 shown in FIG. 10A are sized to hold a single grain seed or kernel in addition to any desired flavoring or cooking medium. As the kernels heat and pop, they absorb the flavoring placed in a particular cell. FIG. 10B shows a cross-section of FIG. 10A, showing the vertical shape of cell walls 404. As shown in FIG. 10B, each cell is formed so that it is narrower towards the top cover 302 of grain pod 300 and becomes wider moving towards bottom cover 306. As the kernel is heated by heating element 602 and eventually reaches its popping temperature, the kernel expands, or pops. As the kernel expands, the shape of cells 402 in FIG. 10B apply pressure to the portion of the kernel towards top cover 302, thereby ejecting the popped kernel through the bottom cover 306 of grain pod 300. The change in diameter or width of cells 404 from the top of grain pod 300 to the bottom of grain pod 300 can be altered to achieve more or less pressure on the kernel in the pod upon popping. The vertical angle of cell walls 404, shown in FIG. 10B, are preferably between 1 and 45 degrees. More preferably, the angle is between 2 and 10 degrees, and most preferably approximately 4 degrees. Cells 404 can also be formed to have the same, or substantially the same, that is, within acceptable manufacturing variations, diameters and widths from the top of the grain pod 300 to the bottom of grain pod 300.

FIG. 10B also illustrates an alternate embodiment of sidewall 304. As shown in FIG. 10B, raised lip 310 of sidewall 304 extends upward from the top of grain pod 300. Sidewall 304 is formed with a notch 1002 towards the bottom thereof. When grain pods 300 are stacked in a package containing multiple grain pods, upper lip 310 rests inside notch 1002 to secure the stacked grain pods together and to provide a resting surface for the pods so that the top and bottom covers of grain pods 300 stacked together in a package remain slightly apart from each other. This helps prevent breakage or damage to of the top and bottom cover during shipping, delivery, and storage of grain pods 300.

Figures 11A, 11B:
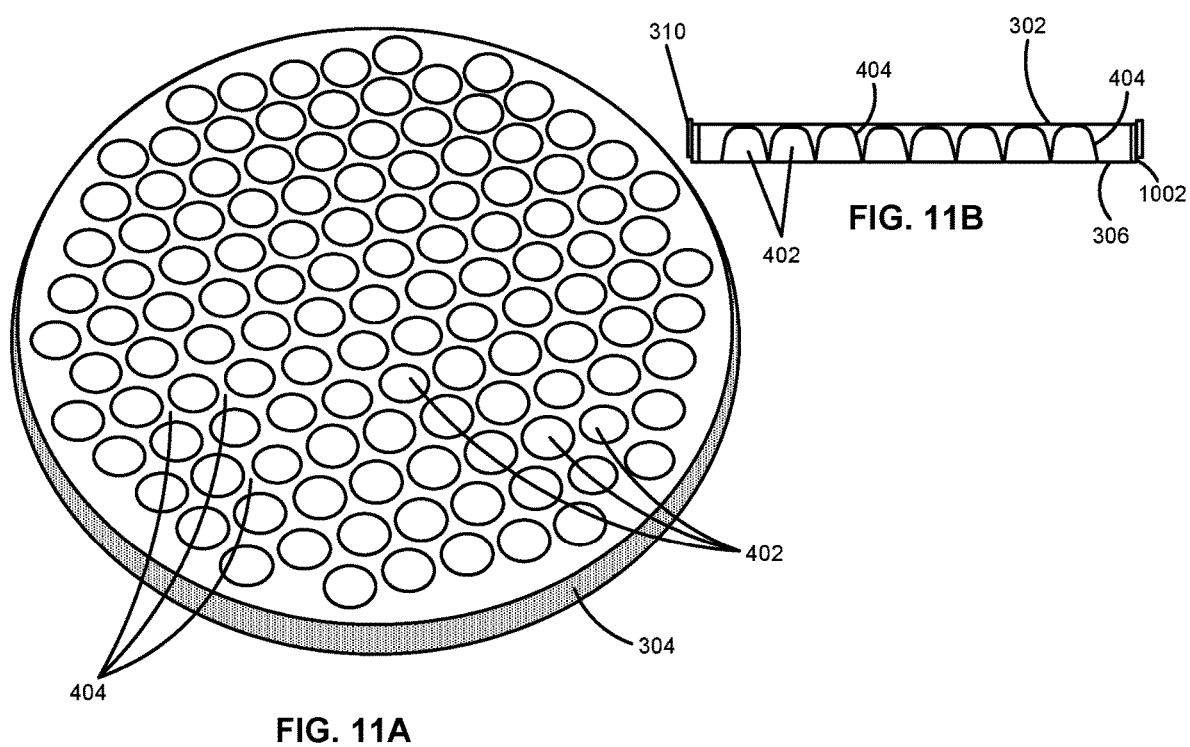
FIGS. 11A and 11B are top perspective and cross-section views, respectively, of a grain pod according to another embodiment of the present invention.

FIGS. 11A and 11B illustrate another embodiment of grain pod 300. As shown in FIG. 11A, the cells 402 are circular when viewed from the top. Cell walls 404 divide the cells 402. FIG. 11B shows a cross-section of the grain pod 300 illustrated in FIG. 11A. As with the grain pod 300 shown in FIGS. 10A and 10B, the cells 402 of the FIG. 11B grain pod are wider towards the bottom of the grain pod than they are at the top. The cell walls 404 are slightly curved so that each cell is generally in the shape of an inverted U with the open part of the U facing the bottom of grain pod 300 and being wider than the diameter of the bottom of the U, which is positioned near or in contact with top cover 302 of the grain pod. As with the embodiments shown in FIGS. 10A and 10B, the grain pod 300 shown in FIGS. 11A and 11B feature a raised upper lip 310 and a notch 1002 in the bottom of the sidewall. These features, as described above, aid in stacking packaging and delivering the grain pods.

Figure 12:
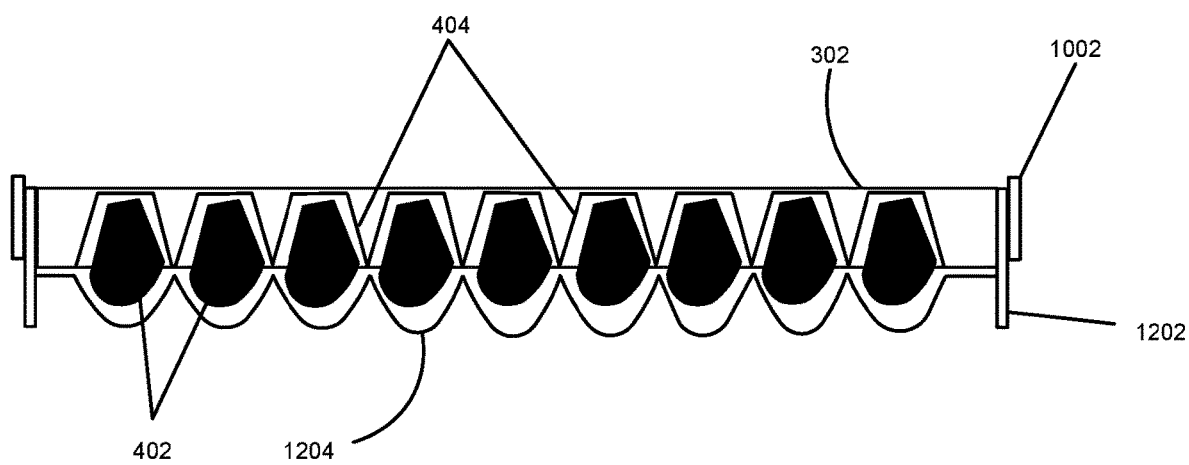
FIG. 12 is a cross-section view of a grain pod according to another embodiment of the present invention.

FIG. 12 illustrates a cross-section of another embodiment of grain pod 300. The grain pod shown in FIG. 12 is similar to the previously described grain pods, with the exception that the cells are approximately half as high as the cells of the previous embodiments. As a result, the grains or kernels placed in each cell protrude, at least partially, from the cell out from the bottom of the grain pod 300. The grains are still sealed into the cells by a bottom cover, but in this embodiment the bottom cover is, preferably, a flexible membrane 1204 that holds the grain kernels in their cells 402 and seals each cell off from other cells 402, but that conforms to the shape of the kernels protruding from the cells 402. The grain pod 300 shown in FIG. 12 also features an extended inner lip 1202, which extends slightly beyond the lowest point of flexible membrane 1204. The extended inner lip 1202 rests on the top of the sidewall so that when the pods are stacked, the membrane cover 1204 does not make contact with the top cover 302 of grain pod 300. In doing so, the extended inner lip 1202 prevents unwanted tearing or damage to the flexible membrane 1204 or top cover 302 during packaging, shipment, delivery, and storage. Configuring the cells so that they are less deep than the height required to accommodate a full kernel aids in ejecting the kernels from the cells as they pop. Because they are already partially out, the pressure created by the open cells facilitates the kernels breaking through the flexible membrane 1204 as they pop. The cells 402 may also be shaped so that they have a wider diameter towards the flexible membrane 1204 of grain pod 300 than towards the top cover 302. It is understood that various cell shapes and sizes can be used with the flexible membrane shown in 1204.

Figure 13:
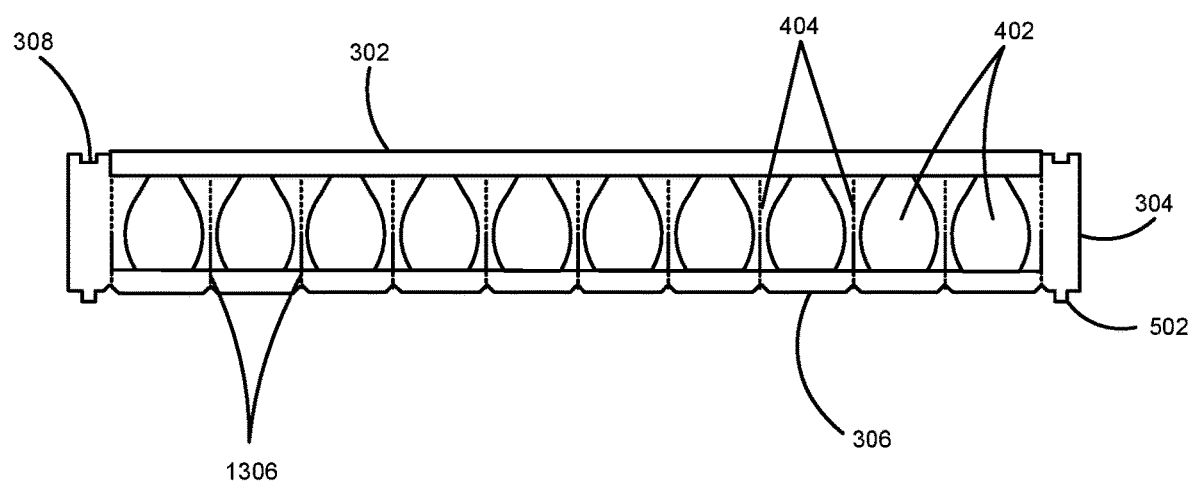
FIG. 13 is a cross-section view of a grain pod according to another embodiment of the present invention.
Figure 14:
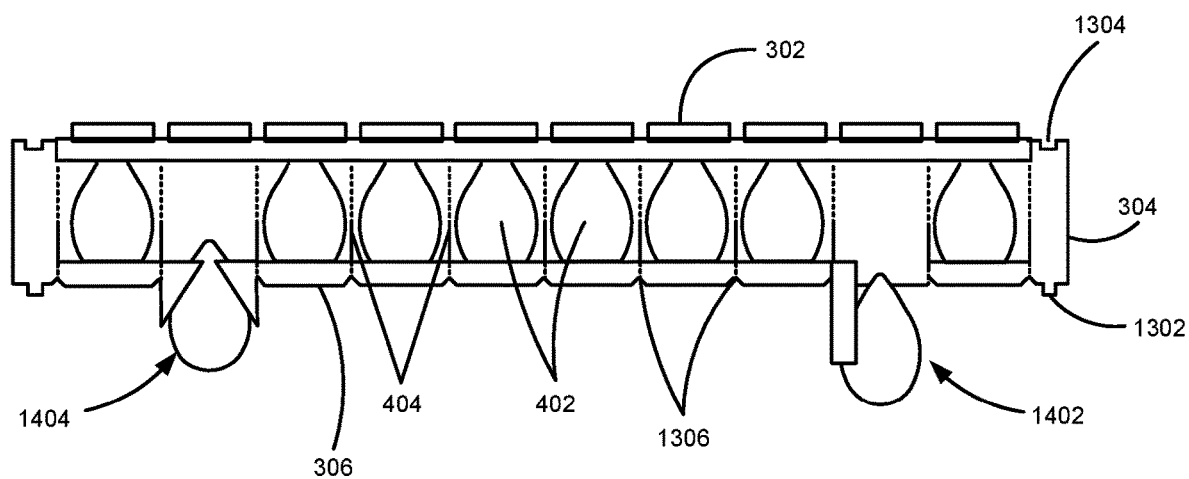
FIG. 14 is another cross-section view of the grain pod of FIG. 13.

FIG. 13 illustrates another embodiment of grain pod 300. As shown in FIG. 13, the cells 402 have a bulbous shape, but still with the top portion of the cells 402 closest to top cover 302 being narrower than the bottom portion of cells 402. Again, as in previous embodiments, this encourages the kernel to exit the pod downward as it pops. Also shown in FIG. 13 are a series of perforations or weakened areas 1306 in the bottom cover 306 of grain pod 300. In a preferred embodiment, these perforations allow the bottom cover 306 to tear as the kernel pops and exits the bottom cover 306. As shown in FIG. 14, for example, the bottom cover is easier to pierce by the kernel than if it did not have a perforation. Embodiments of these weakened areas will be described in further detail with respect to FIG. 14. Also shown in FIG. 13 is an alternate embodiment of the stacking and mating systems described earlier. As seen in FIG. 13, inner lip 502 extends downward, creating a male mating end, and channel 308 on the top portion of grain pod 300 is adapted to receive the inner lip 502.

FIG. 14 illustrates various methods of weakening bottom cover 306 of grain pod 300 so that the kernels can more easily break through the bottom cover 306. The kernel designated as 1404 has exited through the bottom cover 306. The portion of bottom cover 306 next to the cell that kernel 1404 is exiting from has been weakened, either mechanically or by other means, approximately in the center of the cell 402, so that when the kernel breaks through bottom cover 306, the bottom cover 306 splits approximately in the middle of the cell and the edges of the bottom cover 306 remain attached to the top of cell walls 404 so that the material that forms the bottom cover 306 does not exit into the receiver 104. The material of the bottom cover 306 thereby stays attached to the grain pod 300 instead of falling into the receiver 104 with the popped grain. Similar results are achieved if a flexible membrane 1204 is used.

In another embodiment, as shown with reference to kernel 1402 in FIG. 14, the bottom cover 306 can be weakened, for example, by physical perforations or other weakening, along only one side or portion of a cell 402. In operation, this is similar to the perforation described with respect to kernel 1404, except that instead of the ripped pieces of the bottom cover 306 remaining attached to all sides of the cell walls 404, the bottom cover 306 may be held to only a portion of the top of cell walls 404. For example, one half of the bottom cover corresponding to a particular cell 402 may remain attached to the cell walls 404, while the other half may be pre-perforated or otherwise weakened so that it breaks off, easily allowing the kernel to escape when it pops. Although thus far discussion of weakening the bottom cover 306 has focused mostly on physical perforation of the bottom cover 306, that is merely one example of potential ways to weaken portions of the bottom cover 306 to facilitate escape of a kernel. Instead of perforating at particular locations, the bottom cover could be formed of a thinner material at those particular locations or it could be formed of a different material at those locations that weakens faster than the main body of bottom cover 306 as temperature increases. In other embodiments, the material that fastens bottom cover 306 to the top of cell walls 404 may be varied at certain locations in order to facilitate breaking of the bottom cover 306. For example, a portion of the material bonding bottom cover 306 to the cell walls 404 could be a different bonding material than other portions. The bonding material in the weakened portions might be chosen so that it melts and creates a weaker bond at higher temperature than other portions of the bonding material to achieve similar results to perforation or mechanical weakening. For embodiments that feature mechanical perforation, or some other type of mechanical weakening of bottom cover 306, various methods can be used to achieve that perforation. For example, the bottom cover 306 could be pre-perforated during manufacturing and before shipment. In alternate embodiments the grain-popping machine 100 can be formed with a mechanical perforator or weakener inside, so that when a user inserts grain pod 300 into grain popping machine 100, the bottom cover 306 of grain pod 300 is perforated in grain popping machine 100 or during insertion into the grain-popping machine 100.

Figure 15:
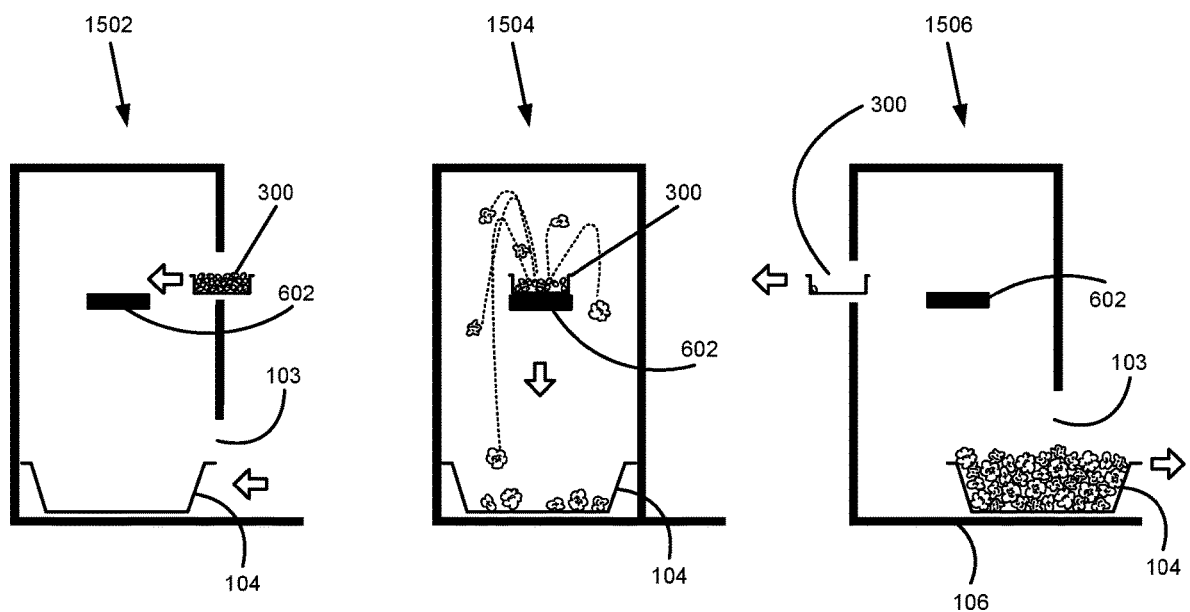
FIG. 15 illustrates a grain popping machine and method of popping grains in accordance to another embodiment of the present invention.
Figure 16:
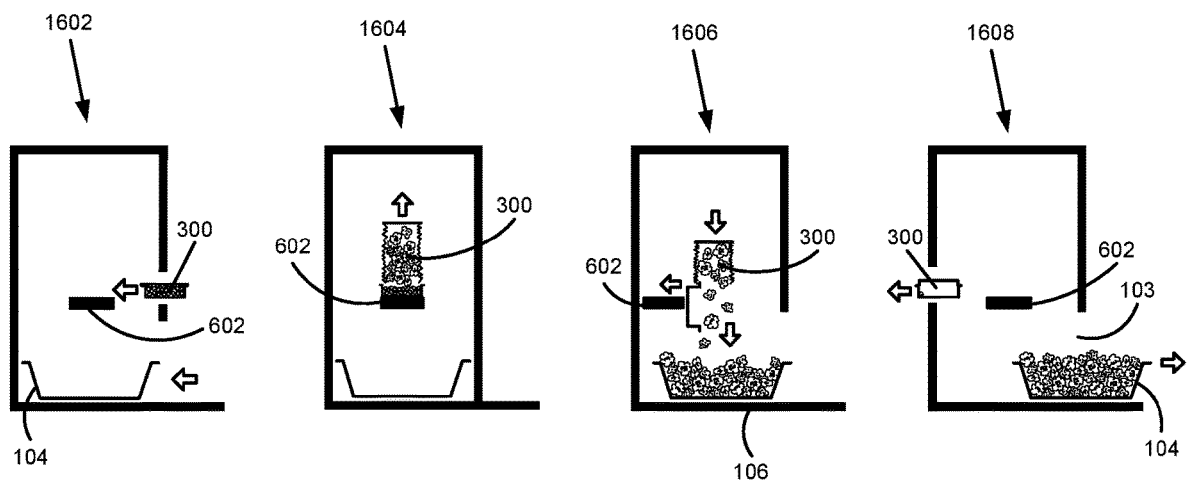
FIG. 16 illustrates a grain popping machine and method of popping grains in accordance to another embodiment of the present invention.
Figure 17:
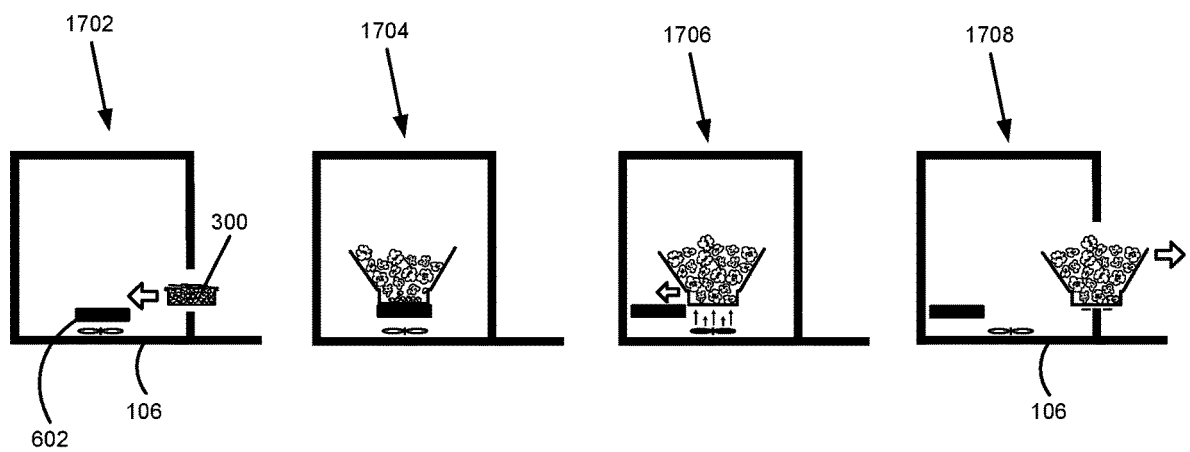
FIG. 17 illustrates a grain popping machine and method of popping grains in accordance to another embodiment of the present invention.

FIGS. 15-17 illustrate alternate embodiments of grain popping machine 100 according to the present invention. In FIG. 15, grain pod 300 is positioned inside grain popping machine 100 so that it is above heating element 602 instead of below heating element 602. Grain pod 300 is flipped from the configuration shown in previous embodiments where the kernel exits from the bottom of grain pod 300. In the embodiment shown in FIG. 15 of the grain pod 300, the kernels exit towards the top of the grain-popping machine 100 instead of straight down. As heating element 602 heats the kernels within grain pod 300 to the appropriate temperature for that particular grain, the grains would pop; exiting the grain pod 300, and gravity causes the popped kernels to fall down into receiver 104, as shown in step 1504. In the embodiment shown in FIG. 15, a fan, preferably a silent fan, could be used to help the kernels exit the grain pod 300 and filter down to receiver 104. Once the receiver 104 is full of the popped grains, it can be removed from dock 103 as shown in step 1506.

FIG. 16 shows another embodiment of grain popping machine 100. In the embodiment in FIG. 16, grain pod 300 is positioned inside the machine above heating element 602 instead of below. As shown in step 1602, grain pod 300 is configured so that as the grains pop, the grain pod expands and the sidewall 304 of the grain pod expands. Once the grains have popped, the heating element is mechanically removed, preferably automatically, from underneath grain pod 300. The bottom of grain pod 300 is pulled with heating element and the popped kernels are pulled by gravity into the receiver 104 and can then be removed from the dock 103, as shown in step 1608.

FIG. 17 shows another embodiment of grain popping machine 100 according to the present invention. In FIG. 17, grain pod 300 is inserted into grain popping machine 100 so that it is positioned above heating element 602. As heating element 602 heats the kernels in grain pod 300 to the popping temperature, grain pod 300 expands into a bucket shape. The bucket formed by the grain pod 300 in this embodiment serves as a receiver 104 and grain pod 300 itself, in its bucket shape, can be removed from grain popping machine 100 for serving the popped grains. As shown in step 1706, heating element 602 is mechanically moved, in some embodiments, from the bottom of grain pod 300, and a cooling fan can cool the expanded grain pod 300 so that it is safe for handling by a consumer. It is understood that grain pod 300 shown in FIG. 17 could take various shapes on expansion and is not strictly confined to the shape shown in FIG. 17.

Figure 18:
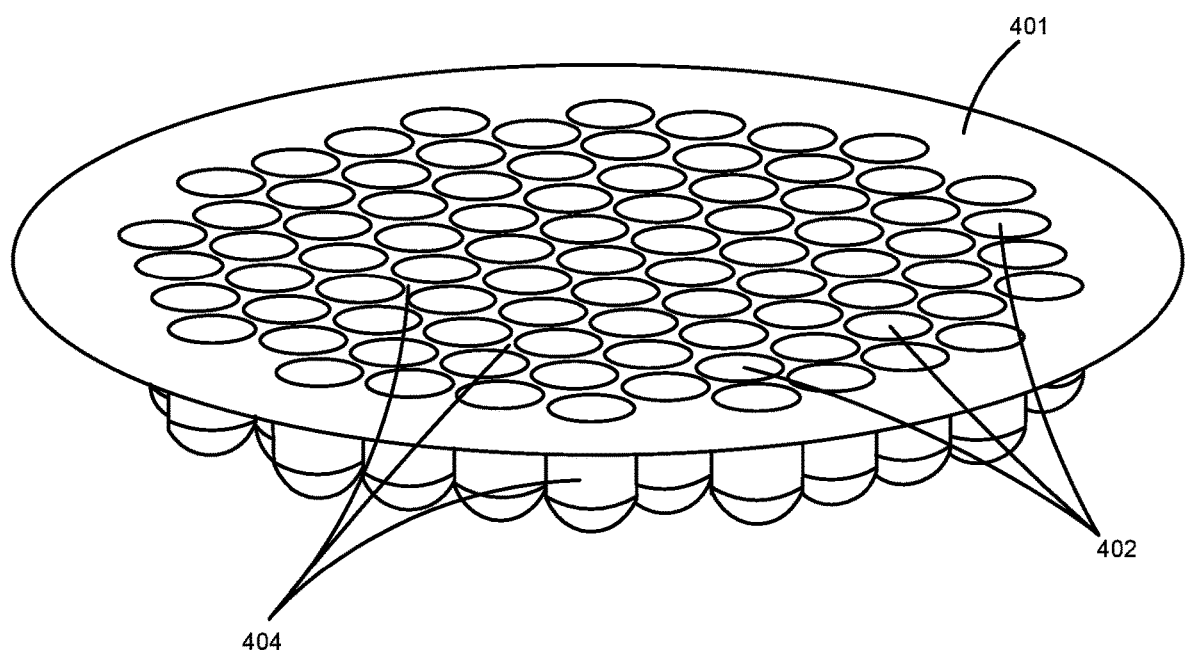
FIG. 18 illustrates a perspective view of a grain pod insert or partial grain pod according to another embodiment of the present invention.

FIG. 18 illustrates a portion of a portion of a grain pod insert 401. Grain pod insert 401 is preferably formed of a thermoplastic polymer, although other materials compatible with use in the food industry can be used. Various types of polymers are contemplated for grain pod insert 401, including natural polymers and synthetic thermoplastic polymers, including but not limited to nylon. Additives can be included in the polymers used to form grain pod insert 401.

Grain pod insert 401 includes cells 402 and cell walls 404 similar to those described with respect to other embodiments of the present invention. As shown in FIG. 18, cells 402 are formed with a generally circular cross section and a rounded bottom. However, it is understood that cells 402 could be formed in a variety of cross-sectional shapes, including, but not limited to, the hexagonal and square cross-sectional shapes described with respect to other embodiments herein. Cells 402 could also be formed with a flat bottom instead of the rounded bottom shown in FIG. 18. Because grain pod insert 401 is preferably formed of a polymer, e.g., a nylon material, it can be formed by heating a flat sheet of polymer to a temperature at which the polymer can be stretched into the form shown in FIG. 18 by application of mechanical force to the polymer sheet. Forming grain pod insert 401 in this manner simplifies manufacturing. In addition, polymers such as nylon are known to weaken as they are heated, and through polymer compounding, which involves mixing or blending polymers and additives to alter certain properties of the resulting material, the polymers can be engineered to reach a desired weakness at desired temperatures. As a result, a grain pod 300 constructed with grain pod insert 401 does not require a bottom cover 306. The cells 402 of grain pod insert 401 are closed at the bottom portion thereof, which serves to retain grains, flavoring, and cooking medium within the cells 402. The polymer forming grain pod insert 401 is engineered to weaken to near breaking point at the ambient temperature at which grains contained in cells 402 will begin to pop. As a result, the popping grains can easily break through the bottom of cells 402, while unpopped grains remain in their cell 402 until they begin to pop. It is understood that grain pod insert 401 could also be formed using extrusion or injection molding.

Figure 19:
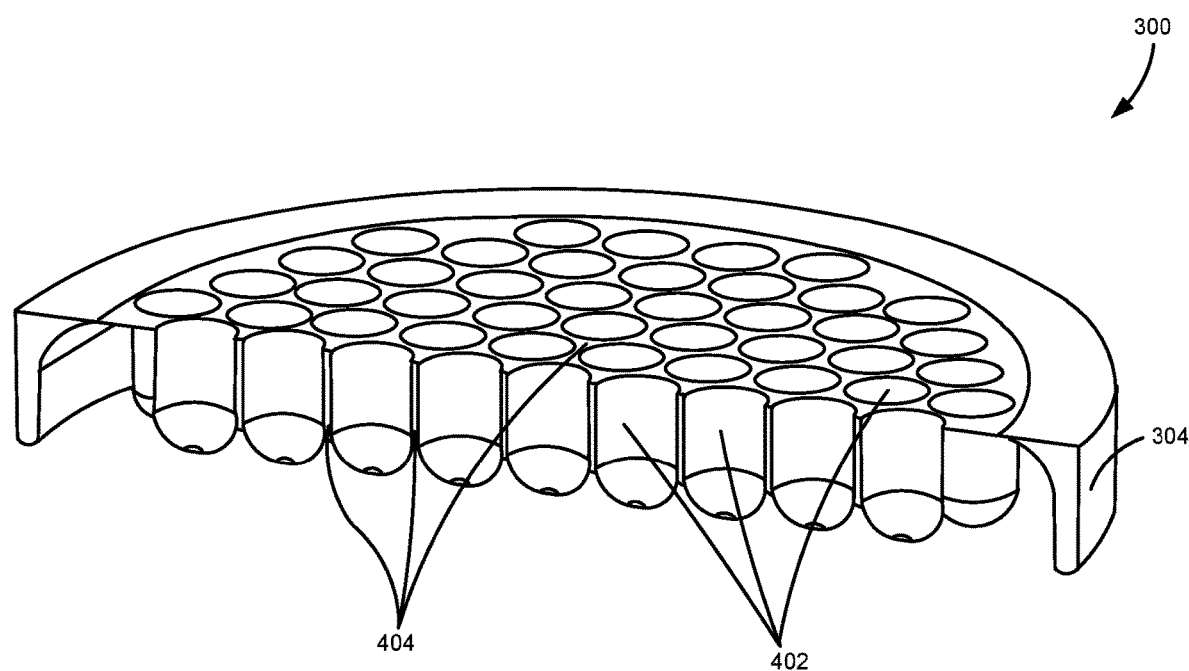
FIG. 19 is a cross-section view of a grain pod according to the embodiment shown in FIG. 18.
Figure 20:
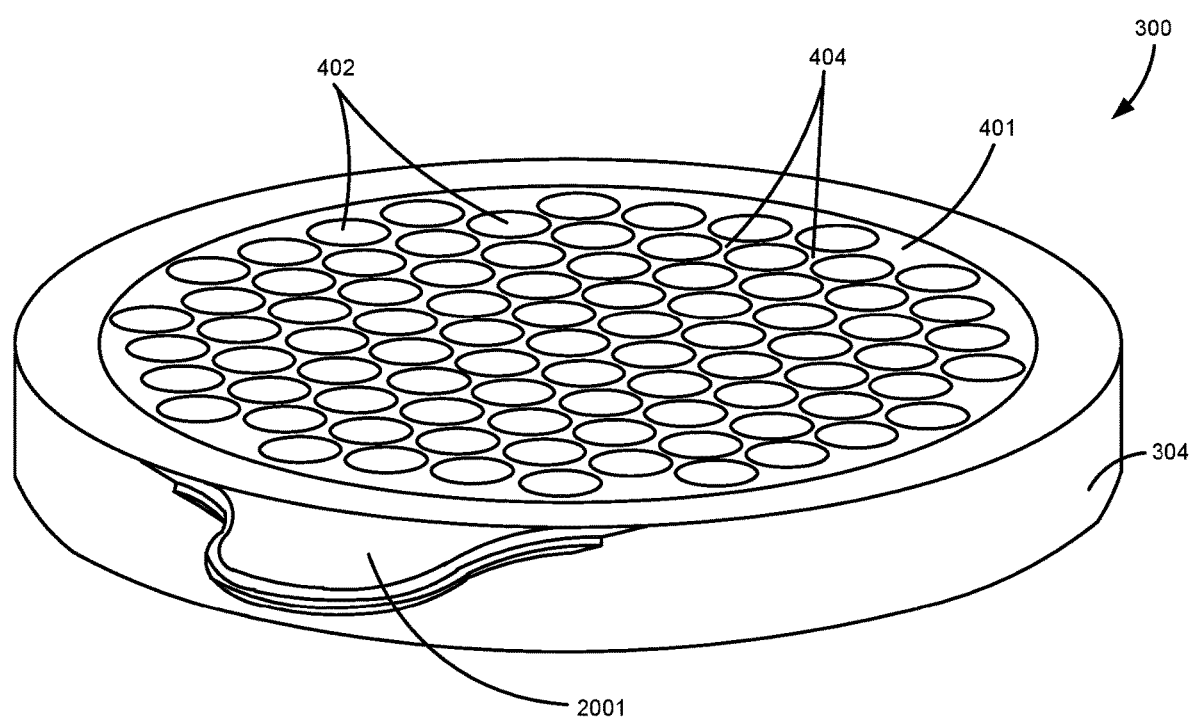
FIG. 20 is a perspective view of a grain pod according to the embodiment shown in FIG. 18.

FIG. 19 is a cross-sectional view of a grain pod 300 formed with grain pod insert 401. After it is formed, grain pod insert 401 can be attached to a sidewall 304 by various methods known in the art. Grain pod 300 as shown in FIG. 19 can also be formed as a single piece using the same methods detailed with respect to grain pod insert 401, that is, by heating and mechanically manipulating a polymer, or by extrusion or injection molding. Attaching grain pod insert 401 to a separately formed sidewall 304 in order to form grain pod 300 allows for a different material to be used for the sidewall 304. It can be desirable to use a stronger and less heat-sensitive material for the sidewall 304, which is subject to forces during shipping and user manipulation that grain pod insert 401 may not experience. FIG. 20 is a top perspective view of the grain pod 300 described with respect to FIGS. 18 and 19. As noted above, grain pod insert 401 may be formed separately and attached to sidewall 304, or the entire grain pod 300 can be formed as a single unit. As shown in FIG. 20, grain pod 300 can include a tab 2001 formed with or attached to sidewall 304. Tab 2001 facilitates user handling of grain pod 300.

Figure 21:
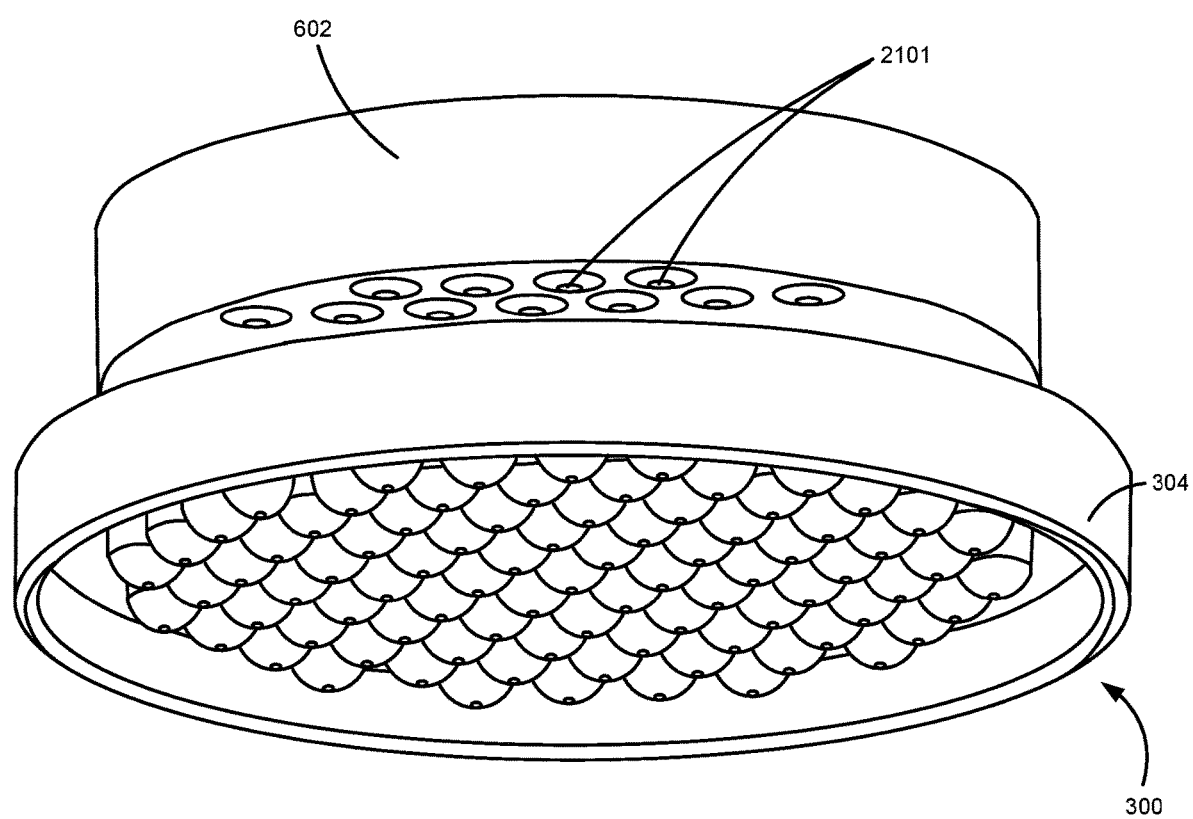
FIG. 21 is a bottom perspective view of a grain pod according to the embodiment shown in FIG. 18 with a corresponding heating element 602.
Figure 22:
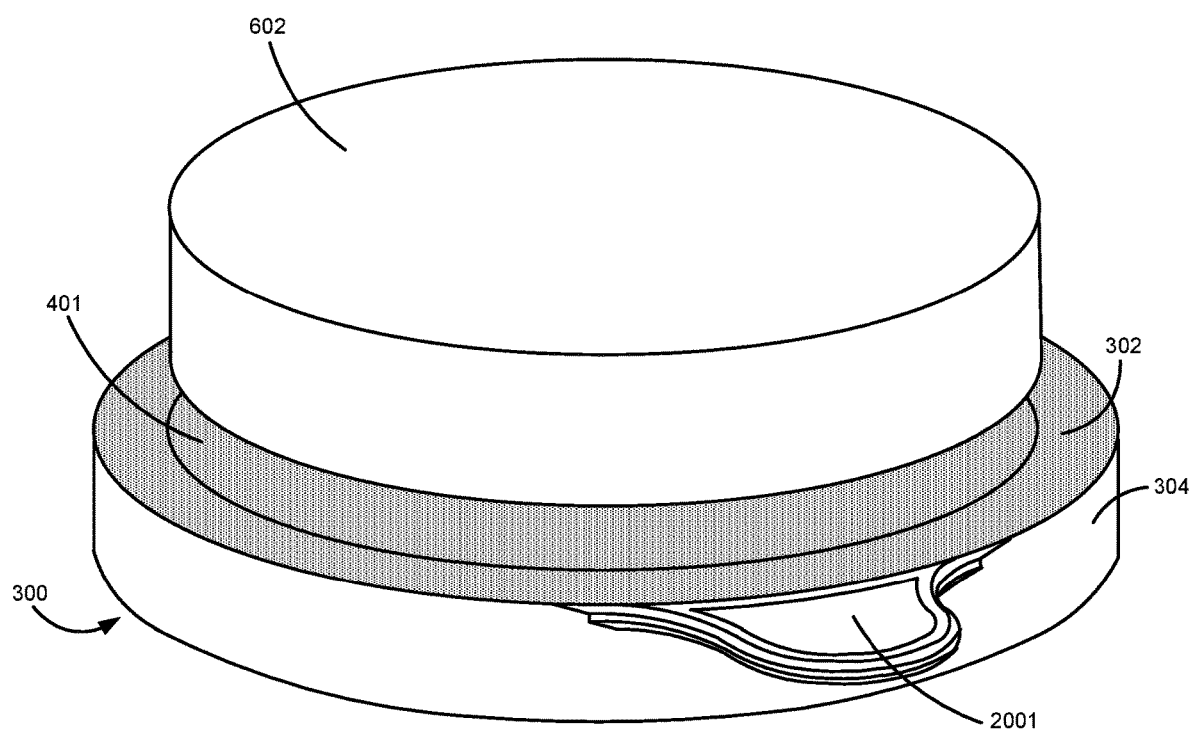
FIG. 22 is a top perspective view of a grain pod according to the embodiment shown in FIG. 18 with a corresponding heating element 602.

FIG. 21 illustrates grain pod 300 as described with respect to FIGS. 18-20 with a heating element 602. As shown, heating element 602 has protrusions 2101 extending from its bottom surface. Protrusions 2101 provide targeted heating to cells 302. Preferably, protrusions 2101 match the cross-sectional shape of cells 402, here, a circular shape. In addition, protrusions 2101 are arranged on heating element 602 such that, when grain pod 300 is positioned in a pod dock, described herein, protrusions 2101 are positioned so that each protrusion 2101 is centered on a cell 402, thereby providing targeted heat to the opening at the top of each cell 402. In operation, heating element 602 can be mechanically lowered onto the top of grain pod 300 so that protrusions 2101 press down onto top cover 302 (not shown). The portions of top cover 302 directly above each cell 402 can be formed to depress into the cell 402 as the protrusions 2101 on heating element 602 apply pressure to top cover 302. This provides more focused and direct heat transfer from heating element 602 because heat is applied in closer proximity to the grains and cooking medium in each cell 402. The contents of cells 402 can also be vacuum sealed, so that heat from protrusions 2101 transfers direct through top cover 302 and is applied directly to the grains and cooking medium in the cells 402. FIG. 22 illustrates heating element 602 positioned above grain pod 300, with the top cover 302 covering the top of cells 402.

Systems, methods and apparatus are provided herein. References to "preferred embodiments," "another embodiment," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described. After reading the description, it will be apparent to one skilled in the relevant art how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A grain popping system comprising:
a housing defining a chamber, wherein the chamber is at least partially enclosed to define an interior space, and wherein the chamber comprises a top and a bottom;
a heating element positioned in the interior space of the chamber;
a grain pod comprising at least one cell, wherein the cell is defined by cell walls having a top edge and a bottom edge, the cell having a first width between the top edge of the cell walls and a second width between the bottom edge of the cell walls, each cell containing flavoring, a cooking medium, and one or more grains, wherein the grain pod comprises a top cover and a bottom cover, wherein the cell walls extend between the top cover of the grain pod and the bottom cover of the grain pod, and wherein the top cover of the grain pod is attached to the top edge of the cell walls;
a pod dock configured to receive the grain pod, wherein the pod dock is positioned inside the interior space of the chamber adjacent to the heating element, and wherein the pod dock is positioned between the heating element and the bottom of the chamber;
wherein the bottom cover of the grain pod faces the bottom of the chamber when the grain pod is positioned in the pod dock;
wherein heating the grain pod heats the cooking medium and the one or more grains in the cell, thereby causing the one or more grains to exit the grain pod by piercing the bottom cover of the grain pod.

2. The grain popping system of claim 1, wherein the chamber includes a mechanical weakener that weakens the bottom cover of the grain pod along a portion of the bottom edge of the cell walls to facilitate exit of the one or more grains from the cell.

3. The grain popping system of claim 2, wherein the mechanical weakener is a perforating device.

4. The grain popping system of claim 2, wherein the mechanical weakener is configured to weaken the bottom cover along seventy five percent or less of the bottom edge of the cell wall.

5. The grain popping system of claim 4, wherein the mechanical weakener is configured to weaken the bottom cover along fifty percent or less of the bottom edge of the cell wall.

6. The grain popping system of claim 1, wherein each cell contains a single grain.

7. The grain popping system of claim 1, wherein the bottom cover of the grain pod is attached to the bottom edge of the cell walls at least in part by a temperature sensitive adhesive that weakens at elevated temperatures.

8. The grain popping system of claim 1, wherein the grain pod is formed from a piece of a polymer material.

9. The grain popping system of claim 8, wherein the cells of the grain pod are formed by mechanically deforming the heated polymer to form the at least one cell.

10. The grain popping system of claim 9, wherein the bottom cover of the grain pod comprises the deformed polymer material.

11. The grain popping system of claim 1, wherein at least one protrusion extends from a bottom surface of the heating element, and wherein the at least one protrusion is positioned such that when the grain pod is positioned in the pod dock, the at least one protrusion is centered over the at least one cell.

12. The grain popping system of claim 1, wherein the first width is less than and the second width.

* * * * *

UNITED STATES PATENT AND TRADEMARK OFFICE
CERTIFICATE OF CORRECTION

PATENT NO. : 10,674,754 B2  
APPLICATION NO. : 15/960383  
DATED : June 9, 2020  
INVENTOR(S) : Roulier et al.

Page 1 of 1

It is certified that error appears in the above-identified patent and that said Letters Patent is hereby corrected as shown below:

On the Title Page

Item [72], insert:  
--Tejinder Grewal Englewood, CO--

Signed and Sealed this  
Seventeenth Day of August, 2021

Drew Hirshfeld  
*Performing the Functions and Duties of the*  
*Under Secretary of Commerce for Intellectual Property and*  
*Director of the United States Patent and Trademark Office*